(12) United States Patent
Lee

(10) Patent No.: US 10,512,106 B2
(45) Date of Patent: Dec. 17, 2019

(54) STATE TRANSITION METHOD BASED ON RANDOM ACCESS PROCEDURE IN COMMUNICATION SYSTEM

(71) Applicant: Electronics and Telecommunications Research Institute, Daejeon (KR)

(72) Inventor: Kyoung Seok Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 39 days.

(21) Appl. No.: 15/666,560

(22) Filed: Aug. 1, 2017

(65) Prior Publication Data
US 2018/0049244 A1 Feb. 15, 2018

(30) Foreign Application Priority Data

Aug. 12, 2016 (KR) .......... 10-2016-0103211
Dec. 7, 2016 (KR) .......... 10-2016-0165885
Jan. 5, 2017 (KR) .......... 10-2017-0001953
Jul. 3, 2017 (KR) .......... 10-2017-0084232

(51) Int. Cl.
*H04W 74/08* (2009.01)
*H04W 76/27* (2018.01)

(52) U.S. Cl.
CPC ....... *H04W 74/0833* (2013.01); *H04W 76/27* (2018.02)

(58) Field of Classification Search
CPC ............. H04W 74/0883; H04W 76/27; H04W 72/042; H04W 28/0278; H04W 74/0825; H04L 5/0053; H04L 5/0091; H04L 61/6054

USPC ................................. 370/329, 311
See application file for complete search history.

(56) References Cited

U.S. PATENT DOCUMENTS

| | | | |
|---|---|---|---|
| 7,881,724 B2 | 2/2011 | Park et al. | |
| 8,559,382 B2 | 10/2013 | Kim et al. | |
| 8,582,592 B2 | 11/2013 | Gorokhov et al. | |
| 8,934,354 B2 | 1/2015 | Jeong | |
| 2009/0135769 A1* | 5/2009 | Sambhwani | H04L 5/0053 370/329 |
| 2015/0173054 A1* | 6/2015 | Ohta | H04L 5/0053 370/329 |
| 2016/0037450 A1* | 2/2016 | Richards | H04W 52/0209 370/311 |

(Continued)

OTHER PUBLICATIONS

A novel state model for 5G radio access networks—Da Silva et al.—Jun. 2016 (Year: 2016).*

(Continued)

*Primary Examiner* — William Nealon
(74) *Attorney, Agent, or Firm* — Rabin & Berdo, P.C.

(57) ABSTRACT

A random access (RA) procedure based state transition method in a communication system is disclosed. A terminal in the communication system may comprise transmitting a RA preamble to a base station when an uplink data unit to be transmitted exists in the terminal; receiving a RA response from the base station in response to the RA preamble; and transmitting a message including the uplink data unit to the base station through a resource indicated by the RA response. Therefore, performance of the communication system can be enhanced.

10 Claims, 11 Drawing Sheets

(56) References Cited

U.S. PATENT DOCUMENTS

2016/0150564 A1* 5/2016 Quan .................. H04L 61/6054
370/329

OTHER PUBLICATIONS

R2-163441 Discussion of RRC States in NR—3GPP TSG RAN WG2 Meeting #94-05-2016 (Year: 2016).*
R2-164807—3GPP TSG RAN WG2 Meeting #95—Aug. 2016 (Year: 2016).*
S2-161276_MobilityFramework-v2—Feb. 2016 (Year: 2016).*
S2-161323—SA WG2 Meeting #S2-113ah—Feb. 2016 (Year: 2016).*
3GPP TS36.212 V13.2.0 (Jun. 2016) (Year: 2016).*
LTE in Wireless—SIB2 in LTE (Dec. 2012) (Year: 2012).*

* cited by examiner

400

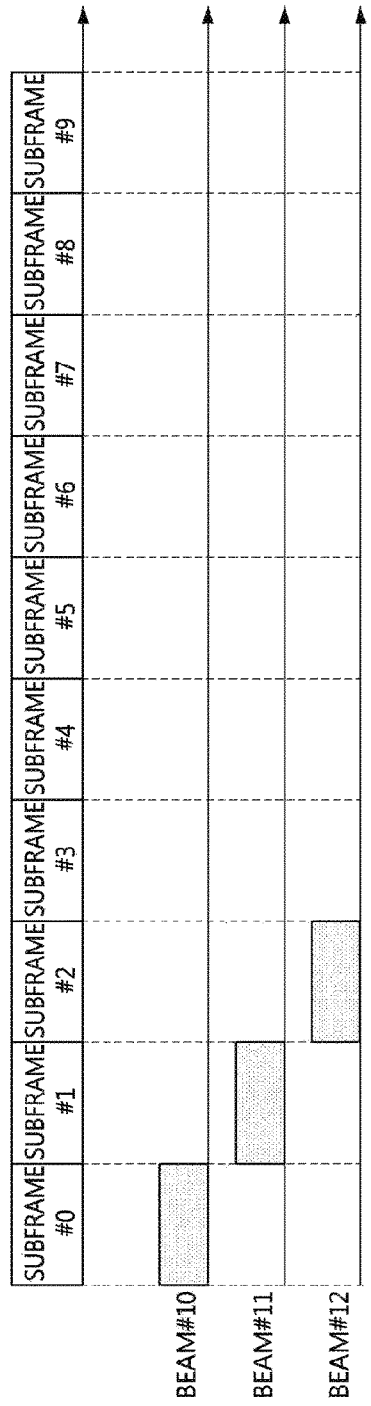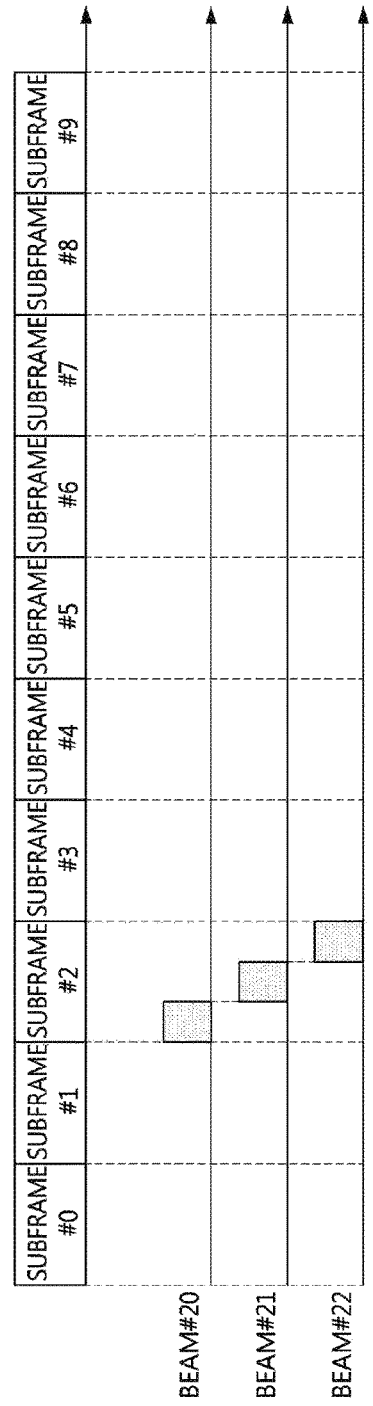

STATE TRANSITION METHOD BASED ON RANDOM ACCESS PROCEDURE IN COMMUNICATION SYSTEM

CROSS-REFERENCE TO RELATED APPLICATIONS

This application claims priorities to Korean Patent Applications No. 10-2016-0103211 filed on Aug. 12, 2016, No. 10-2016-0165885 filed on Dec. 7, 2016, No. 10-2017-0001953 filed on Jan. 5, 2017, and No. 10-2017-0084232 filed on Jul. 3, 2017 in the Korean Intellectual Property Office (KIPO), the entire contents of which are hereby incorporated by reference.

BACKGROUND

1. Technical Field

The present disclosure relates to a cellular communication technology, and more specifically, to a method for state-transition of a terminal based on a random access procedure in a communication system.

2. Related Art

A communication system may comprise a core network (e.g., a serving gateway (S-GW), a packet data network (PDN) gateway (P-GW), a mobility management entity (MME)), a base station, a terminal, and the like. The base station may be connected to the S-GW and the MME of the core network, and provide services to the terminal belonging to cell coverage of the base station. That is, the terminal belonging to the cell coverage of the base station may communicate with the base station. In such the communication system, various techniques are required for enhancing data throughput between the base station and the terminal, reducing power consumption of the terminal, and reducing transmission latency of the terminal.

Meanwhile, the terminal may operate in a radio resource control (RRC) idle state or in a RRC connected state. The operation state of the terminal may be transitioned from the RRC idle state to the RRC connected state when data communication with the base station is required, and the terminal may perform data communication with the base station in the RRC connected state. In order to achieve the above-described technical requirements (data throughput enhancement, power consumption reduction, and transmission latency reduction), a new operation state may be introduced in addition to the RRC idle state and the RRC connected state. In this case, state transition methods among the RRC idle state, the RRC connected state, and the new operation state, and operations in the new operation state should be defined.

SUMMARY

Accordingly, embodiments of the present disclosure provide state transition methods of a terminal in a communication system.

In order to achieve the objective of the present disclosure, an operation method of a terminal in a communication system, the terminal operating in a radio resource control (RRC) inactive state among a RRC idle state, the RRC inactive state, and a RRC connected state, may comprise transmitting a random access (RA) preamble to a base station when an uplink data unit to be transmitted exists in the terminal; receiving a RA response from the base station in response to the RA preamble; and transmitting a message including the uplink data unit to the base station through a resource indicated by the RA response.

The RRC idle state may be a state in which the terminal is not connected to the base station, each of the RRC inactive state and the RRC connected state may be a state in which the terminal is connected to the base station, the base station may not support a scheduling operation of the terminal when the terminal operates in the RRC inactive state, and the base station may support a scheduling operation of the terminal when the terminal operates in the RRC connected state.

The RA preamble may be transmitted from the terminal to the base station when a size of the uplink data unit is equal to or smaller than a predetermined threshold.

The operation method may further comprise performing a state transition from the RRC inactive state to the RRC connected state when the size of the uplink data unit exceeds the predetermined threshold; and transmitting the uplink data unit to the base station based on a scheduling operation of the base station after performing the state transition.

The RA preamble may include an indicator requesting transmission of the uplink data unit and information on a size of the uplink data unit.

The RA preamble may be transmitted through a physical random access channel (PRACH) indicated by system information or a downlink control information (DCI) received from the base station.

The RA response may include information indicating the resource allocated for transmitting the uplink data unit.

The message may further include information indicating a buffer status of the terminal.

In order to achieve the objective of the present disclosure, an operation method of a terminal in a communication system, the terminal operating in one of a radio resource control (RRC) idle state, a RRC inactive state, and a RRC connected state, may comprise performing a state transition from the RRC idle state to the RRC connected state based on a random access (RA) procedure between the terminal and a base station, when the terminal operates in the RRC idle state; performing a state transition from the RRC connected state to the RRC idle state or the RRC inactive state based on a request of the base station, when the terminal operates in the RRC connected state; and performing a state transition from the RRC inactive state to the RRC connected state based on a RA procedure between the terminal and the base station, when the terminal operates in the RRC inactive state.

The RRC idle state may be a state in which the terminal is not connected to the base station, each of the RRC inactive state and the RRC connected state may be a state in which the terminal is connected to the base station, the base station may not support a scheduling operation of the terminal when the terminal operates in the RRC inactive state, and the base station may support a scheduling operation of the terminal when the terminal operates in the RRC connected state.

The terminal may be state-transitioned from the RRC connected state to the RRC inactive state according to a request of the base station when the terminal supports a low latency service.

The terminal may be state-transitioned from the RRC inactive state to the RRC connected state when a paging channel is received from the base station.

The RA procedure for the state transition from the RRC inactive state to the RRC connected state may be a procedure for resuming a connection link between the terminal and the base station.

In order to achieve the objective of the present disclosure, a terminal in a communication system, operating in a radio resource control (RRC) inactive state among a RRC idle state, the RRC inactive state, and a RRC connected state, may be provided. The terminal may comprise a processor and a memory storing at least one instruction executed by the processor, and the at least one instruction may be configured to transmit a random access (RA) preamble to a base station when an uplink data unit to be transmitted exists in the terminal; receive a RA response from the base station in response to the RA preamble; and transmit a message including the uplink data unit to the base station through a resource indicated by the RA response.

The RRC idle state may be a state in which the terminal is not connected to the base station, each of the RRC inactive state and the RRC connected state may be a state in which the terminal is connected to the base station, the base station may not support a scheduling operation of the terminal when the terminal operates in the RRC inactive state, and the base station may support a scheduling operation of the terminal when the terminal operates in the RRC connected state.

The RA preamble may be transmitted from the terminal to the base station when a size of the uplink data unit is equal to or smaller than a predetermined threshold.

The at least one instruction may be further configured to perform a state transition from the RRC inactive state to the RRC connected state when the size of the uplink data unit exceeds the predetermined threshold; and transmit the uplink data unit to the base station based on a scheduling operation of the base station after performing the state transition.

The RA preamble may include an indicator requesting transmission of the uplink data unit and information on a size of the uplink data unit.

The RA response may include information indicating the resource allocated for transmitting the uplink data unit.

The message may further include information indicating a buffer status of the terminal.

According to the embodiments of the present disclosure, in a communication system, a terminal may operate in an RRC idle state, an RRC connected state, or an RRC inactive state. For example, the terminal operating in the RRC idle state may transition to the RRC connected state or the RRC inactive state, the terminal operating in the RRC connected state may transition to the RRC idle state or the RRC inactive state, and the terminal operating in the RRC inactive state may transition to the RRC idle state or the RRC connected state. That is, in order to save power, the terminal may operate in the RRC idle state. Also, the terminal may operate in the RRC inactive state in order to improve transmission performance and reduce transmission latency.

In the communication system, system information may be classified into basic system information, additional system information, and the like. The terminal receiving the basic system information may request the base station to transmit the additional system information. The base station may transmit the additional system information to the terminal according to the request of the terminal, and the terminal may receive the additional system information from the base station. Alternatively, the additional system information may be transmitted without the request of the terminal. The system information is classified into the basic system information and the additional system information, and the additional system information is transmitted only when necessary, so that signaling overhead of the system information can be reduced and the system information can be efficiently transmitted. Therefore, the performance of the communication system can be improved.

BRIEF DESCRIPTION OF DRAWINGS

Embodiments of the present disclosure will become more apparent by describing in detail embodiments of the present disclosure with reference to the accompanying drawings, in which:

FIG. 15 is a timing diagram for explaining a first embodiment of a beamforming transmission performed by a base station in the communication system illustrated in FIG. 14; and FIG. 16 is a timing diagram for explaining a first embodiment of a beamforming transmission performed by a terminal in the communication system illustrated in FIG. 14.

DETAILED DESCRIPTION

Figure 1:
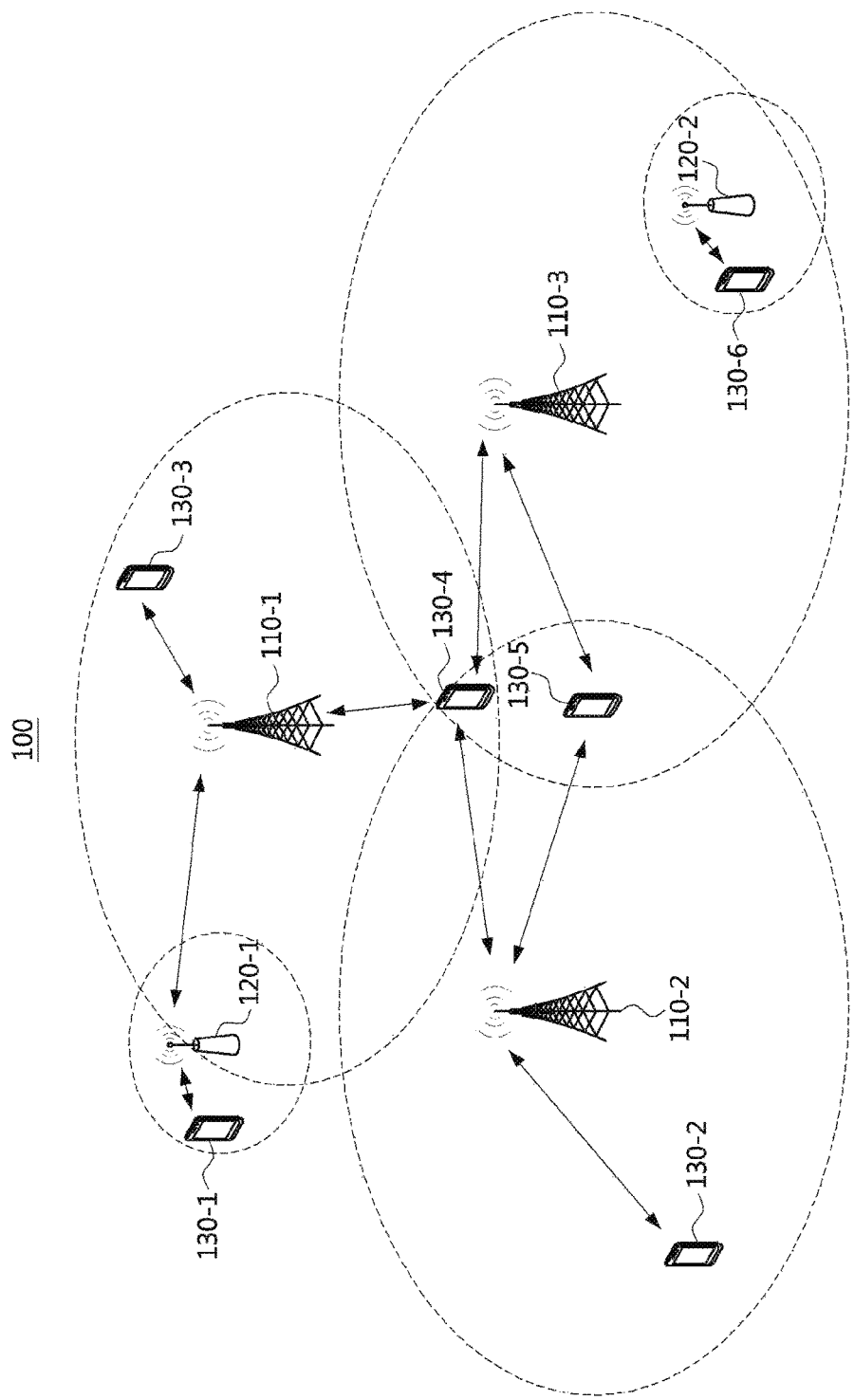
FIG. 1 is a conceptual diagram illustrating a first embodiment of a cellular communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a cellular communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may comprise a core network (e.g., a serving gateway (S-GW), a packet data network (PDN) gateway (P-GW), a mobility management entity (MME), and the like).

The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
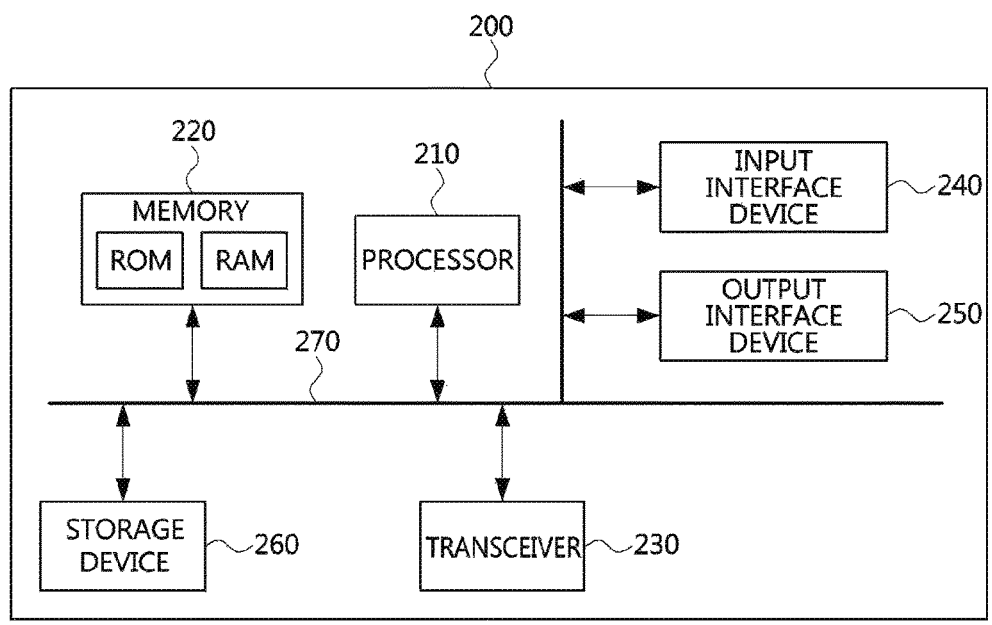
FIG. 2 is a block diagram illustrating a first embodiment of a communication node constituting a cellular communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame may be applied to a communication system based on frequency division duplexing (FDD), a type 2 frame may be applied to a communication system based on time division duplexing (TDD), and a type 3 frame may be applied to a unlicensed band based communication system (e.g., a licensed assisted access (LAA) based communication system).

Figure 3:
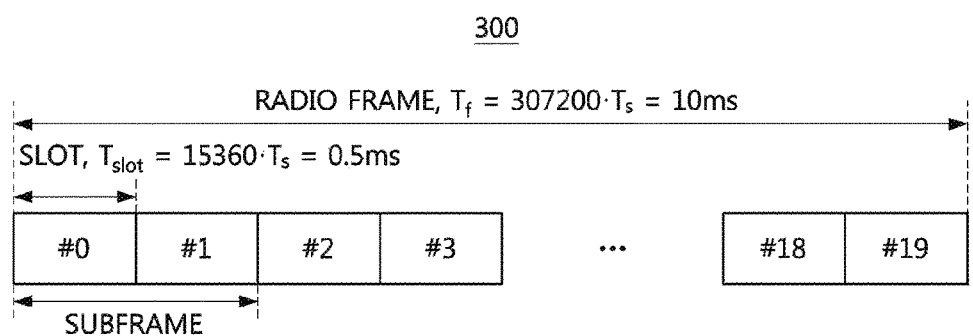
FIG. 3 is a conceptual diagram illustrating a first embodiment of a type 1 frame.

FIG. 3 is a conceptual diagram illustrating a first embodiment of a type 1 frame.

Referring to FIG. 3, a radio frame 300 may comprise 10 subframes, and a subframe may comprise 2 slots. Thus, the radio frame 600 may comprise 20 slots (e.g., slot #0, slot #1, slot #2, slot #3, . . . , slot #18, and slot #19). The length of the radio frame ($T_f$) 300 may be 10 milliseconds (ms). The length of the subframe may be 1 ms, and the length of a slot ($T_{slot}$) may be 0.5 ms. Here, $T_s$ may be 1/30,720,000 s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on the configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
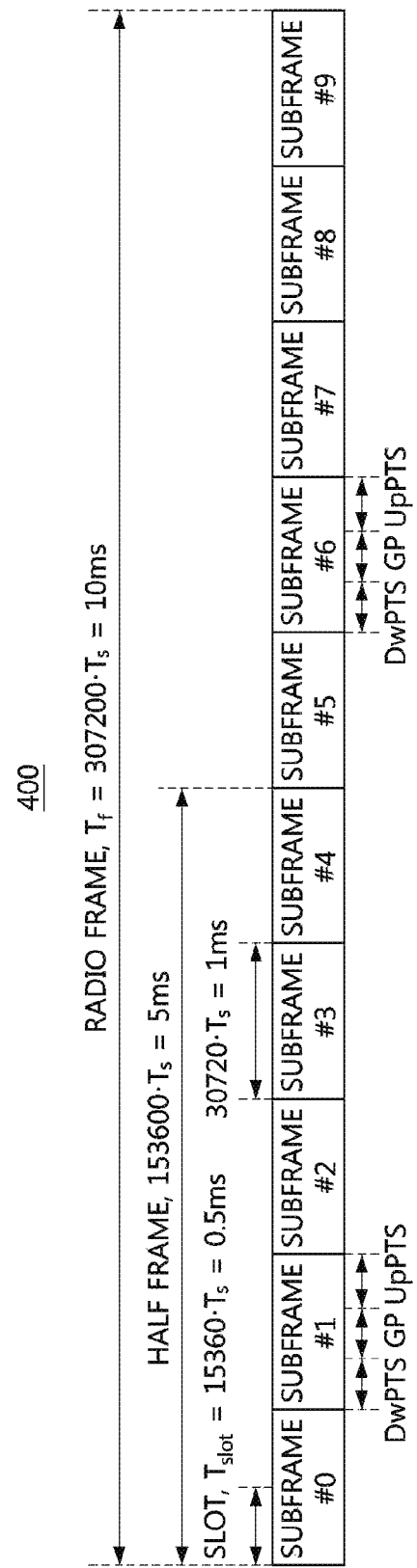
FIG. 4 is a conceptual diagram illustrating a first embodiment of a type 2 frame.

FIG. 4 is a conceptual diagram illustrating a first embodiment of a type 2 frame.

Referring to FIG. 4, a radio frame 400 may comprise two half frames, and a half frame may comprise 5 subframes. Thus, the radio frame 400 may comprise 10 subframes. The length ($T_f$) of the radio frame 400 may be 10 ms. The length of the half frame may be 5 ms. The length of the subframe may be 1 ms. Here, $T_s$ may be 1/30,720,000 s.

The radio frame 400 may include at least one downlink subframe, at least one uplink subframe, and a least one special subframe. Each of the downlink subframe and the uplink subframe may include two slots. The length of a slot $T_{slot}$ may be 0.5 ms. Among the subframes included in the radio frame 400, each of the subframe #1 and the subframe #6 may be a special subframe. The special subframe may include a downlink pilot time slot (DwPTS), a guard period (GP), and an uplink pilot time slot (UpPTS).

The DwPTS may be regarded as a downlink interval and may be used for cell search, time and frequency synchronization acquisition of the terminal, and the like. The GP may be used for resolving interference problems of uplink data transmission caused by delay of downlink data reception. Also, the GP may include a time required for switching from the downlink data reception operation to the uplink data transmission operation. The UpPTS may be used for uplink channel estimation, time and frequency synchronization acquisition, and the like.

The lengths of the DwPTS, the GP, and the UpPTS included in the special subframe may be variably adjusted as needed. In addition, the number and position of each of the downlink subframe, the uplink subframe, and the special subframe included in the radio frame 400 may be changed as needed.

Figure 5:
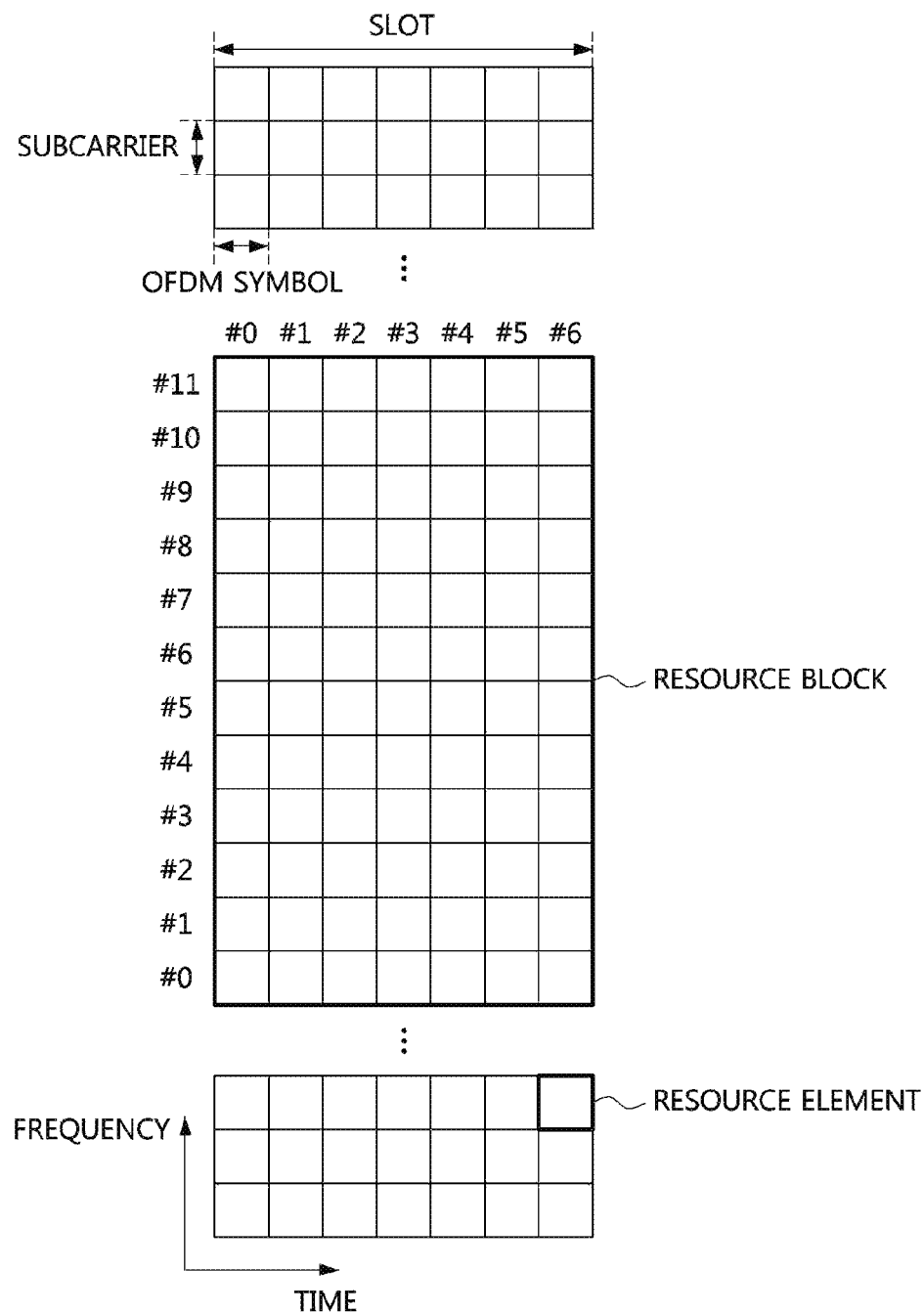
FIG. 5 is a conceptual diagram illustrating a first embodiment of a resource grid of a slot included in a subframe.

FIG. 5 is a conceptual diagram illustrating a first embodiment of a resource grid of a slot included in a subframe.

Referring to FIG. 5, a resource block (RB) of a slot included in a downlink subframe or an uplink subframe may be composed of 7 OFDM symbols in the time domain and 12 subcarriers in the frequency domain when the normal CP is used. Each of the 7 OFDM symbols may be referred to as symbol #0, symbol #1, symbol #2, symbol #3, symbol #4, symbol #5, symbol #6 and symbol #7. Each of the 12 subcarriers may be referred to as subcarrier #0, subcarrier #1, subcarrier #2, subcarrier #3, subcarrier #4, subcarrier #5, subcarrier #6, subcarrier #7, subcarrier #8, subcarrier #9, subcarrier #10 and subcarrier #11. In this case, a resource constituted by one OFDM symbol in the time domain and one subcarrier in the frequency domain may be referred to as a 'resource element (RE)'.

In the downlink transmission of the communication system, resource allocation for a terminal may be performed in units of RB pairs, and the length of the RB pair in the time domain may be 1 millisecond (ms). Resource mapping for an uplink control channel (e.g., a physical uplink control channel (PUCCH)) may be performed in units of RB pairs. For example, the PUCCH may be mapped to a RB included in the slot #0 of the subframe #0 and a RB included in the slot #1 of the subframe #0. The mapping for the reference signal, the synchronization signal, and the like may be performed in units of REs.

Meanwhile, a radio frame may be configured differently from the radio frames shown in FIGS. 3 to 5 according to numerology of the communication system. For example, if a subcarrier spacing is 30 kHz in a new communication system (e.g., a new radio (NR) communication system) as compared to a subcarrier spacing of 15 kHz in the radio frames shown in FIGS. 3 to 5 and, in the NR communication system, the length of a subframe may become 1 ms, the subframe may comprise two slots the length of which is 0.5 ms, and each slot may comprise 14 symbols.

Alternatively, if a subcarrier spacing is 120 kHz in the NR communication system, in the NR communication system, the length of a subframe may become 0.25 ms, the subframe may comprise two slots the length of which is 0.125 ms, and each slot may comprise 14 symbols.

Alternatively, if a subcarrier spacing is 240 kHz in the NR communication system, in the NR communication system, the length of a subframe may become 0.125 ms, the subframe may comprise two slots the length of which is 0.0625 ms, and each slot may comprise 14 symbols.

Hereinafter, operation methods of a communication node in the communication system will be described. The communication node may support a radio frame according to the radio frame structure (e.g., a subframe structure) or the numerology of subcarrier spacing shown in FIGS. 3 to 5. Even if a method (e.g., transmission or reception of a signal) to be performed at a first communication node among the communication nodes is described, the corresponding second communication node may perform a method (e.g., reception or transmission of a signal) corresponding to the method performed at the first communication node. That is, when the operation of the terminal is described, the corresponding base station may perform an operation corresponding to the operation of the terminal. Conversely, when the operation of the base station is described, the corresponding terminal may perform an operation corresponding to the operation of the base station.

Random Access Procedure Based on a Fixed Resource

A random access (RA) procedure based on a fixed resource in a communication system may be performed as follows. The RA procedure may be performed when a terminal attempts an initial access to a base station or when the base station is not ready for a scheduling operation for the terminal.

Figure 6:
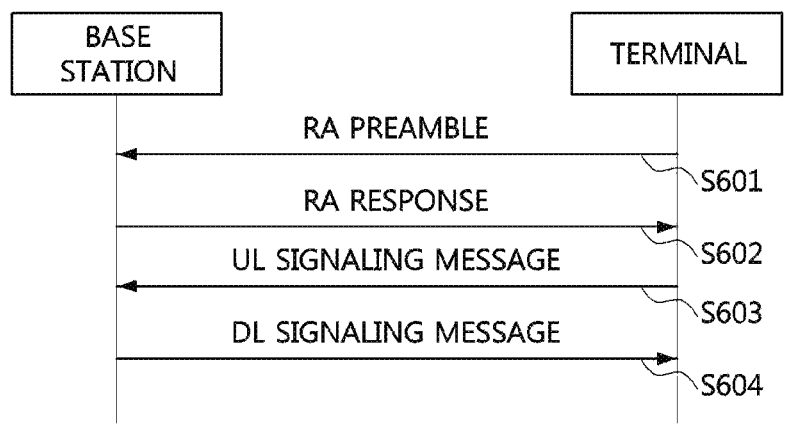
FIG. 6 is a sequence chart for explaining a first embodiment of a random access procedure in a communication system.

FIG. 6 is a sequence chart for explaining a first embodiment of a random access procedure in a communication system.

Referring to FIG. 6, a communication system may include a base station, a terminal, and the like. The base station may be the same as or similar to the base stations 110-1, 110-2, 110-3, 120-1, and 120-2 shown in FIG. 1, and the terminal may be the same as or similar to the terminals 130-2, 130-3, 130-4, 130-5, and 130-6. Also, each of the base station and the terminal may be configured to be the same as or similar to the communication node 200 shown in FIG. 2.

The base station may transmit a synchronization signal (e.g., a primary synchronization signal (PSS), and a secondary synchronization signal (SSS)). The terminal that belongs to cell coverage of the base station may receive the synchronization signal from the base station and may be downlink-synchronized to the base station based on the received synchronization signal. The base station may also transmit system information (e.g., a master information block (MIB), and a system information block (SIB)). The system information may be configured by the base station. The system information may include information on a time and frequency resource (hereinafter referred to as 'MACH resource information') for a physical random access channel (PRACH) through which a RA preamble is transmitted, transmission period information, transmission power information, transmission number information, and preamble sequence information (e.g., a subset of preamble sequences) of the RA preamble. Here, the PRACH resource information may indicate a fixed resource.

The terminal, which is downlink-synchronized with the base station, may receive the system information from the base station, and based on the received system information, the PRACH resource information, the transmission period information, transmission power information, transmission number information, and preamble sequence information of the RA preamble may be identified. Then, the terminal may generate a RA preamble based on the preamble sequence information included in the system information. Alternatively, the terminal may generate a RA preamble based on information obtained from the base station in a previous access procedure between the base station and the terminal. Then, the terminal may transmit the RA preamble through the PRACH indicated by the system information (S601). Alternatively, the UE may generate the RA preamble using an arbitrary preamble sequence, and may transmit the RA preamble through an arbitrary resource.

The base station may receive the RA preamble through the PRACH and identify the preamble sequence of the received RA preamble. The base station may generate a RA response including the identified preamble sequence. The RA response may include timing advance (TA) information, preamble sequence information (e.g., information on the preamble sequence of the received RA preamble), uplink grant information (e.g., uplink resource information), a radio network temporary identifier (RNTI), a beamforming identifier, beam sweeping information (e.g., time, period, and pattern of beam sweeping), and the like. The base station may transmit the RA response (S602). When the base station receives a plurality of RA preambles from a plurality of terminals, the base station may transmit a RA response for each of the plurality of the received RA preambles.

The terminal may receive the RA response from the base station and identify information elements (IEs) included in the received RA response. For example, the terminal may be uplink-synchronized to the base station based on the TA information included in the RA response. On the other hand, if the RA response is not received within a predetermined time, the terminal may retransmit the RA preamble to the base station.

When uplink synchronization between the base station and the terminal is acquired, the terminal may generate an uplink (UL) signaling message (e.g., a radio resource control (RRC) signaling message). The UL signaling message may include information on a terminal identifier, a preamble sequence, a beamforming identifier, beam sweeping information, and the like. The terminal may transmit the UL signaling message through a resource indicated by the uplink grant information included in the RA response (S603).

The base station may receive the UL signaling message from the terminal and identify the IEs included in the UL signaling message. For example, the base station may identify the terminal identifier based on the UL signaling message. If the UL signaling message is successfully received, the base station may generate a downlink (DL) signaling message (e.g., a RRC signaling message). The DL signaling message may include a terminal identifier (e.g., the terminal identifier included in the UL signaling message), a beamforming identifier, beam sweeping information, and the like. The base station may transmit the DL signaling message (S604).

The terminal may receive the DL signaling message from the base station and identify the IEs included in the received DL signaling message. For example, if the terminal identifier included in the UL signaling message and the terminal identifier included in the DL signaling message are the same, the terminal may determine that the RA procedure has been successfully completed.

Random Access Procedure Based on a Dynamic Resource

A RA procedure based on a dynamic resource in a communication system may be performed as follows. In a case that the RA procedure is performed using a dynamic resource instead of a fixed resource, availability of resource may be improved and thus the transmission latency may be reduced. Here, a PRACH allocation operation may be performed by a scheduler of a medium access control (MAC) layer instead of the RRC layer.

Figure 7:
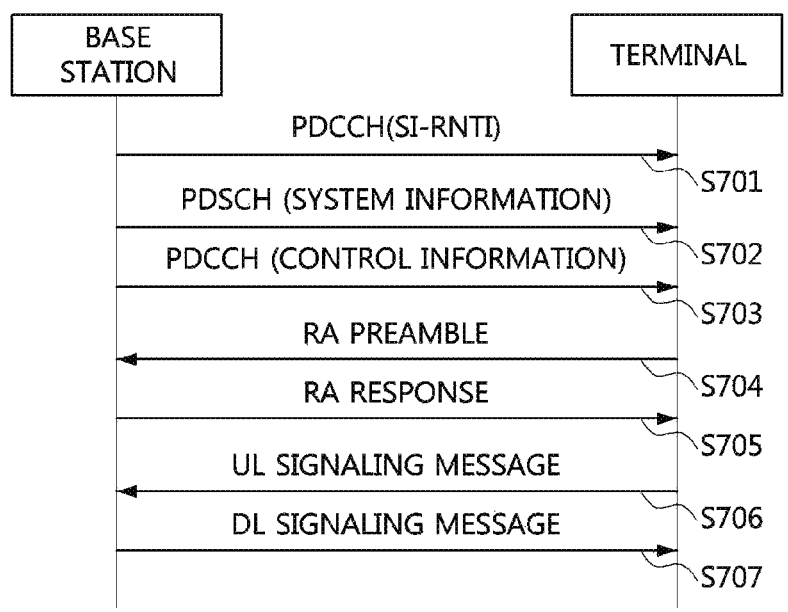
FIG. 7 is a sequence chart for explaining a second embodiment of a random access procedure in a communication system.

FIG. 7 is a sequence chart for explaining a second embodiment of a random access procedure in a communication system.

Referring to FIG. 7, a communication system may include a base station, a terminal, and the like. The base station may be the same as or similar to the base stations 110-1, 110-2, 110-3, 120-1, and 120-2 shown in FIG. 1, and the terminal may be the same as or similar to the terminals 130-2, 130-3, 130-4, 130-5, and 130-6. Also, each of the base station and the terminal may be configured to be the same as or similar to the communication node 200 shown in FIG. 2. The base station may transmit a synchronization signal (e.g., PSS and SSS). The terminal belonging to the cell coverage of the base station may receive the synchronization signal from the base station, and may be downlink-synchronized with the base station based on the received synchronization signal.

Meanwhile, the base station may transmit a physical downlink control channel (PDCCH) including a system information RNTI (SI-RNTI) (S701), and transmit a physical downlink shared channel (PDSCH) including system information (e.g., SIB2) indicated by the SI-RNTI (S702). The system information includes a downlink control information (DCI) format (e.g., a DCI format for a RA procedure), uplink frequency information, uplink bandwidth information, preamble sequence information of a RA preamble (e.g., a subset of preamble sequences), and so on. If PRACH resource information is not included in the control information transmitted in a step S703 to be described later, the system information may further include PRACH resource information. The terminal, which is downlink-synchronized with the base station, may receive the SI-RNTI through the PDCCH, receive the system information indicated by the SI-RNTI through the PDSCH, and identify IEs included in the received system information.

Meanwhile, the base station may generate control information including the IEs necessary for the RA procedure. The control information may include IEs not included in the system information transmitted in the step S702. For example, the control information may include PRACH resource information, transmission period information and transmission number information of the RA preamble. Also, the control information may further include a terminal identifier, information necessary for demodulating the PDSCH, transmission time information and transmission power information of the RA preamble, and the like. The control information may be configured in the DCI format for the RA procedure.

The control information may include PRACH resource information for a single terminal or PRACH resource information for each of a plurality of terminal groups. For example, at least one PRACH resource may be assigned to each terminal group. Here, each terminal group may include at least one terminal. The control information for a single terminal may be indicated by a cell RNTI (C-RNTI) of the single terminal, and the control information for each of the plurality of terminal groups may be indicated in a C-RNTI (hereinafter referred to as a "group C-RNTI") predetermined to be used for group. The group C-RNTI may be included in the system information transmitted in a broadcast manner and may be transmitted to the terminal in a previous access procedure between the base station and the terminal. Further, the PRACH which can be used by all terminals may be indicated by a predetermined C-RNTI.

The size of the PRACH indicated by the control information may be the same as the size of the PRACH used in the RA procedure shown in FIG. 6. For example, the size of the PRACH indicated by the control information may be 6 RBs. Alternatively, the size of the PRACH indicated by the control information may be variable. For example, the size of the PRACH indicated by the control information may be 2 RBs. The PRACH indicated by the control information may be located at the center of the system frequency band in the same manner as the FDD case. Alternatively, the PRACH indicated by the control information may be located in an arbitrary region of the system frequency band. When a large number of PRACHs are required in the communication system, a large number of PRACHs may be allocated to make accesses of multiple terminals easy.

The PRACH resource information may include a PRACH identification number. In this case, since the terminal is able to transmit the RA preamble through the resource indicated by the PRACH identification number, the base station may receive the RA preamble of the terminal without collision between the RA preambles. On the other hand, if the control information does not include the PRACH identification number, the terminal may transmit the RA preamble through an arbitrary resource. The RA preamble transmitted through an arbitrary resource may include a PRACH identification number, and the PRACH identification number included in the RA preamble may be used for an uplink resource request, a D2D resource request, and the like. For example, a PRACH identification number set to '0' may indicate the uplink resource request, and a PRACH identification number set to '1' may indicate the D2D resource request.

The base station may transmit the control information through the PDCCH (S703). The terminal, which is downlink-synchronized with the base station, may receive the control information through the PDCCH, and based on the received control information, the PRACH resource information, the terminal identifier, the transmission period information, transmission number information, transmission time information, and transmission power information of the RA preamble, and the like.

For example, the terminal may generate a RA preamble based on at least one of system information and control information, and may transmit the RA preamble through a resource (i.e., PRACH) indicated by at least one of system information and control information (S704). The RA preamble may be transmitted as follows.

Figure 8:
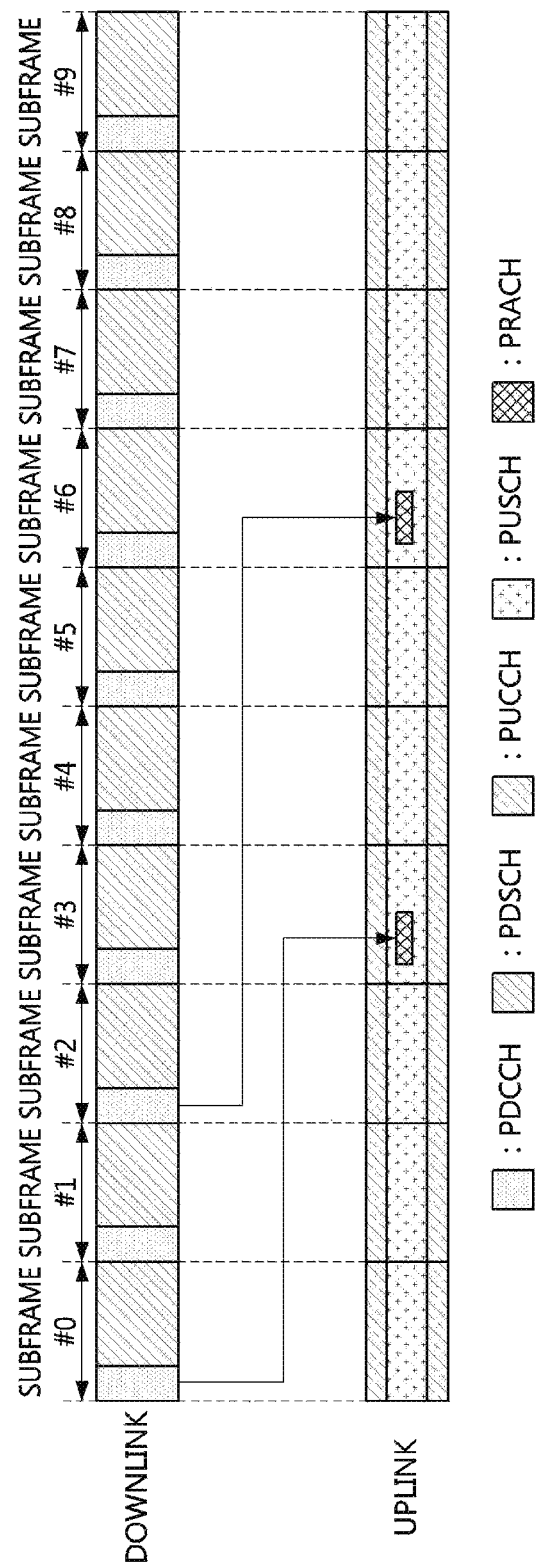
FIG. 8 is a timing diagram for explaining a first embodiment of a random access preamble transmission and reception method.

FIG. 8 is a timing diagram for explaining a first embodiment of a random access preamble transmission and reception method.

Referring to FIG. 8, in a case that transmission time information of a RA preamble is not included in the control information received through a PDCCH of a subframe #0, the terminal may transmit the RA preamble after a predetermined time (e.g., three subframes) from the time of receiving the control information. For example, the terminal may transmit the RA preamble through a PRACH of a subframe #3.

When the control information received via the PDCCH of a subframe #2 includes transmission time information of a RA preamble, the terminal may transmit the RA preamble after a time indicated by the transmission time information+a predetermined time (e.g., three subframes) from the time of receiving the control information. For example, if the time indicated by the transmission time information is one subframe, the terminal may transmit the RA preamble through a PRACH of a subframe #6.

Referring again to FIG. 7, the base station may receive the RA preamble from the terminal. After the RA preamble is received at the base station, a RA response transmission/reception operation between the base station and the terminal (S705), a UL signaling message transmission/reception operation (S706), and a DL signaling message transmission/reception operation (S707) may be performed. The RA response transmission/reception operation (S705) may be performed in the same or similar manner as the step S602 shown in FIG. 6, and the UL signaling message transmission/reception operation (S706) may be performed in the same or similar manner as the step S603 shown in FIG. 6. Also, the DL signaling message transmission/reception operation (S707) may be performed in the same or similar manner as that of step S604 shown in FIG. 6.

Random Access Procedure Based on a Fixed Preamble Sequence

In the communication system, a RA procedure may be performed using a fixed preamble sequence. Here, the preamble sequence may be indicated using a 'preamble index'. For example, the base station may transmit system information including information (e.g., PRACH resource information) on a resource allocated for transmission of a RA preamble, information on a resource allocated for transmission of a RA response, information on a fixed preamble sequence set for each terminal, and so on. The interval between the resource allocated for transmission of the RA preamble and the resource allocated for transmission of the RA response may be set to a predefined interval (for example, three subframes). The resource allocated for the transmission of the RA preamble and the resource allocated for the transmission of the RA response may be located at the center of the system frequency band. The resource allocated for transmission of the RA response may be configured in at least one of the PDCCH and the PDSCH.

The terminal may receive system information from the base station and may generate a RA preamble using the fixed preamble sequence indicated by the received system information, and transmit the RA preamble through a resource (i.e., PRACH) indicated by the received system information. The base station may receive the RA preamble from the terminal and may transmit the RA response to the terminal in response to the RA preamble. The terminal may receive the RA response through the resource indicated by the system information.

When the RA response transmission/reception operation is completed, the UL signaling message transmission/reception between the base station and the terminal (e.g., S603 of FIG. 6 or S706 of FIG. 7), and the DL signaling message transmission/reception between the base station and the terminal (e.g., S604 of FIG. 6 or S707 of FIG. 7) may be performed.

System Information Transmission and Reception Based on RA Preamble

The system information may be classified into basic system information (e.g., common system information, minimum system information, system information block or system information message), and additional system information (e.g., additional system information message). The additional system information may be referred to 'other system information', 'additional system information', and the like. The basic system information may include IEs necessary for communication. For example, the basic system information may include a cell identifier, a public land mobile network (PLMN) identifier, a tracking area (TA) identifier, DL channel information, UL channel information, access control related information (e.g., cell barring information), paging channel information, a beam identifier, a value tag indicating whether the additional system information exists (or has been changed), information on broadcasting of the additional system information (e.g., SI scheduling information), and the like.

Also, when the basic system information includes many IEs, the basic system information may be further classified into a plurality of sub-basic system information (e.g., sub-basic system information #1, sub-basic system information #2, etc.). For example, the sub-basic system information #1 may include essential IEs (e.g., DL channel information, etc.) for the terminal. The sub-basic system information #2 may include IEs not included in sub-basic system information #1. The sub-basic system information #1 may be transmitted through a fixed resource in a broadcast channel (e.g., a physical broadcast channel (PBCH)), and the sub-basic system information #2 may be transmitted via a data channel (e.g., a PDSCH) through a dynamic resource.

The additional system information may include IEs not included in the basic system information. For example, IEs changed from the IEs included in the basic system information may be configured as the additional system information. That is, the base station may change at least one IE when necessary, and the changed IE may be configured as the additional system information. The additional system information may be at least one IE necessary for a terminal operating in an RRC idle state, and may include information for a cell selection operation, information for a cell reselection operation, and the like.

The additional system information may be transmitted aperiodically. For example, the additional system information may be transmitted according to a request of the terminal or according to a determination of the base station. The value tag included in the basic system information may indicate whether or not the additional system information exists. For example, a value tag set to '0' may indicate that no additional system information exists, and a value tag set to '1' may indicate that additional system information is present. Alternatively, the value tag included in the basic system information may indicate whether or not the additional system information has been changed. For example, a value tag set to '0' may indicate that additional system information (e.g., IEs included in additional system information) has not been changed, and a value tag set to '1' may indicate the additional system information (e.g., IEs included in the additional system information) has been changed. Methods of transmitting and receiving the additional system information based on the value tag may be performed as follows.

Figure 9:
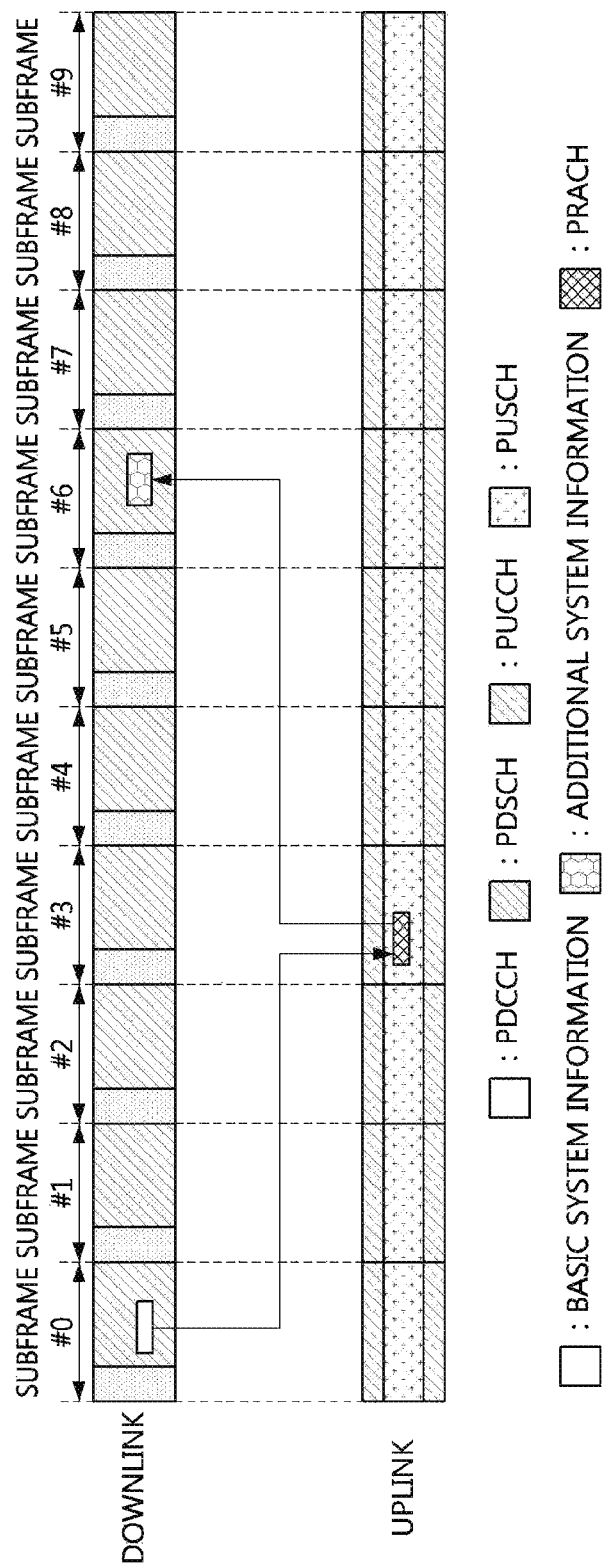
FIG. 9 is a timing diagram for explaining a first embodiment of a method for transmission and reception of additional system information.

FIG. 9 is a timing diagram for explaining a first embodiment of a method for transmission and reception of additional system information.

Referring to FIG. 9, a base station may generate basic system information and transmit the basic system information through a downlink subframe. In a case that additional system information exist, the basic system information may include a value tag (e.g., a value tag set to '1') indicating that the additional system information exists, and further include information on broadcasting of the additional system information (e.g., SI scheduling information).

In order to indicate that the additional system information has been changed, the basic system information may include a value tag (e.g., a value tag set to '1') indicating that the additional system information has been changed. A plurality of additional system information may exist, and a plurality of value tags may be used respectively for the plurality of additional system information.

The terminal may receive the basic system information from the base station and identify the IEs included in the received basic system information. For example, the terminal may determine that the additional system information exists (or the additional system information has been changed) based on the value tag included in the basic system information. Alternatively, the base station may indicate to the terminal that the additional system information has been changed or is to be changed later through a paging channel. In this case, the terminal may determine that the additional system information exists (or the additional system information has been changed) based on the information obtained from the paging channel.

Accordingly, the terminal may generate a RA preamble requesting transmission of the additional system information, and transmit the RA preamble through the PRACH (e.g., the PRACH indicated by the basic system information). A plurality of terminals may respectively transmit the RA preamble using the same resource.

Specifically, the base station may broadcast information on a preamble resource (e.g., RA preamble resource information) for requesting transmission of the additional system information to the terminals through the basic system information. In the basic system information, mapping information between the preamble resource and the additional system information may also be included. The terminal may transmit a preamble (e.g., a RA preamble) using a RA preamble resource (e.g., a preamble index, a time resource, a frequency position, etc.) mapped to necessary additional system information. Other terminals that need the same additional system information may transmit the preamble using the same preamble resource information.

The preamble resource for requesting transmission of the additional system information may be configured separately from usual preamble resources. The transmission period of the preamble for requesting transmission of the additional system information may be configured to be longer than the transmission period of the usual preamble. For example, the transmission period of the preamble for requesting transmission of the additional system information may be set to 10 ms, and the transmission period of the usual preamble may be set to 5 ms. In this case, the base station and the terminal may use a resource not allocated as the preamble resource for requesting transmission of system information as the usual preamble resource.

The resource information of the additional system information used by the base station may include a transmission period, a transmission start time, a transmission period, etc., and the base station may use the resource information of the additional system information to broadcast the additional system information one or more times within the transmission period.

In a case that at least one RA preamble is received from the terminal, the base station may determine that transmission of additional system information is requested. In this case, the base station may generate a RA response and transmit the generated RA response. The terminal may receive the RA response from the base station and may obtain the additional system information transmitted through the RA response. Alternatively, the additional system information may be transmitted from the base station to the terminal separately from the RA response. In this case, the additional system information may be transmitted to the terminal as being broadcasted at a broadcast position indicated in the basic system information.

Specifically, when the RA response corresponding to the RA preamble is received after transmission of the RA preamble, the terminal may determine that the base station broadcasts the additional system information, and receive the additional information at the broadcast position where the additional system information is broadcasted. The reception operation of the additional system information may be repeatedly performed for a preset time according to a periodicity that the corresponding additional system information is broadcasted. If the system information is not received within the preset time, the terminal may request the transmission of the additional system information again. The terminal may receive a RA response corresponding to a RA preamble of the other terminal, determine that other additional system information (i.e., additional system information requested by the other terminal) is broadcast from the base station based on the received RA response, and receive the other additional system information. That is, the base station may transmit a RA response corresponding to additional system information to be broadcasted, and the terminal receiving the RA response from the base station may determine that the other additional system information is broadcasted from the base station based on the received RA response regardless of the RA preamble transmitted by the terminal itself. In this case, the terminal may acquire the other additional system information, and thus may not transmit the RA preamble for acquiring the additional system information. The terminal that has acquired the additional system information may maintain the RRC idle state.

Meanwhile, when a lot of IEs are included in the additional system information, the additional system information may be classified into a plurality of sub-system information. For example, depending on specific application, the additional system information may be classified into sub-additional system information #1, sub-additional system information #2, sub-additional system information #3, sub-additional system information #4, sub-additional system information #5, etc. In this case, the value tag of the basic system information may include a field #1 indicating the number of the plurality of sub-additional system information, and a field #2 indicating whether each of the plurality of sub-additional system information has been changed. In addition, the value tag of the basic system information may further include a field #3 indicating a transmission period of all of changed sub-additional system information when all of the sub-additional system information has been changed. The initial value of the field #2 may be '0', and the field #2 set to a value different from the initial value (e.g., '1') may indicate that the corresponding sub-additional system information has been changed.

The base station may set a preamble sequence to be used for requesting transmission of each of the plurality of sub-additional system information. For example, the base station may generate a preamble sequence #1, a preamble sequence #2, a preamble sequence #3, a preamble sequence #4, and a preamble sequence #5 respectively for the sub-additional system information #1, the sub-additional system information #2, the sub-additional system information #3, the sub-additional system information #4, and the sub-additional system information #5. Also, the base station may set a preamble sequence #0 used for requesting transmission of all sub-additional system information. Information on preamble sequences set by the base station may be transmitted to the terminal through the system information (e.g., basic system information) or the DCI.

In FIG. 9, when there exist a plurality of sub-additional system information, the base station may transmit basic system information including a value tag and the like. The terminal may receive the basic system information from the base station, and identify IEs included in the received basic system information. For example, the terminal may identify the number of the plurality of sub-additional system information based on the field #1 of the value tag, and determine whether each of the plurality of sub-additional system information has been changed based on the value indicated by the field #2 of the value tag. For example, the terminal may determine that the corresponding sub-additional system information has been changed, when the value (e.g., '4') indicated by the field #2 of the value tag of the current basic system information is different from the value (e.g., '3') indicated by the field #2 of the value tag of the previous basic system information.

For example, if it is determined that the sub-additional system information #2 has been changed, the terminal may generate a RA preamble based on the preamble sequence #2, and transmit the generated RA preamble through PRACH. The base station may receive the RA preamble from the terminal and determine that the transmission of the sub-additional system information #2 corresponding to the preamble sequence #2 included in the received RA preamble is requested. Thus, the base station may generate a RA response that includes the sub-additional system information #2, and transmit the generated RA response. The terminal may receive the RA response from the base station, and obtain the sub-additional system information #2 from the received RA response. Alternatively, the sub-additional system information #2 may be transmitted from the base station to the terminal separately from the RA response.

Also, if it is determined that the sub-additional system information #3 or #4 has been changed, the terminal may generate a RA preamble based on the preamble sequence #3 or #4, and transmit the generated RA preamble through PRACH. The base station may receive the RA preamble from the terminal and determine that the transmission of the sub-additional system information #3 or #4 corresponding to the preamble sequence #3 or #4 included in the received RA preamble is requested. Thus, the base station may generate a RA response that includes the sub-additional system information #3 or #4, and transmit the generated RA response. The terminal may receive the RA response from the base station, and obtain the sub-additional system information #3 or #4 from the received RA response. Alternatively, the sub-additional system information #3 or #4 may be transmitted from the base station to the terminal separately from the RA response.

Also, if it is determined that all of the sub-additional system information have been changed, the terminal may generate a RA preamble based on the preamble sequence #0, and transmit the generated RA preamble through PRACH. The base station may receive the RA preamble from the terminal, and determine that the transmission of all the sub-additional system information corresponding to the preamble sequence #0 included in the received RA preamble is requested. Thus, the base station may generate a RA response that includes all the sub-additional system information, and transmit the generated RA response. The terminal may receive the RA response from the base station, and obtain all the sub-additional system information from the received RA response. Alternatively, all the sub-additional system information may be transmitted from the base station to the terminal separately from the RA response.

System Information Transmission and Reception without Transmission of RA Preamble The additional system information may be transmitted without transmission and reception of the RA preamble in the communication system. For example, when the additional system information has been changed, the base station may transmit basic system information including a value tag indicating that the additional system information has been changed, information on transmission time and transmission period of the changed additional system information, etc., and transmit the additional system information based on the transmission time and transmission period indicated by the basic system information. The terminal receiving the basic system information from the base station may identify that the additional system information has been changed based on the value tag, and may identify the transmission time and the transmission period of the changed additional system information. Accordingly, the terminal may receive the changed additional system information from the base station based on the transmission time and the transmission period indicated by the basic system information.

Alternatively, when the additional system information has been changed, the base station may set a transmission period for the changed additional system information. Also, the base station may set a start time and an end time of the transmission period. The base station may generate basic system information including a value tag indicating that the additional system information has been changed, the transmission period for the changed additional system information, the start point, and the end point, and transmit the generated basic system information. Alternatively, the value tag indicating that the additional system information has been changed may be transmitted from the base station to the terminal via a paging channel instead of the basic system information.

The terminal may receive the basic system information from the base station and may identify the transmission period, start time, and end time for the changed additional system information based on the received basic system information. Also, the terminal may identify that the additional system information is transmitted based on the value tag included in the paging channel (or basic system information) received by the base station. If the start time of the transmission period is not explicitly indicated by the basic system information, the terminal may calculate the start time based on Equation 1 below.

$$\text{Start time} = \text{SFN} \% \text{ (the length of the transmission period)} \quad \text{[Equation 1]}$$

Here, a system frame number (SFN) may indicate the number of the radio frame through which the basic system information is received, and '%' may represent a modulo operator. If the length of the transmission period indicated by the basic system information is 80 ms and the result of Equation 1 is 1, the terminal may determine that additional system information is transmitted from the base station for 80 ms from the time corresponding to the result of Equation 1. If the length of the transmission period indicated by the basic system information is 80 ms and the result of Equation 1 is 0, the terminal may determine that the paging channel is transmitted from the base station for 80 ms from the time corresponding to the result of Equation 1.

The base station may repeatedly transmit the additional system information during the transmission period. The terminal may receive the additional system information from the base station by monitoring the transmission period indicated by the basic system information and Equation 1.

System Information Transmission and Reception Based on Transmission Indicator

The basic system information may further include a transmission indicator (TX indicator) as well as the value tag. The TX indicator may indicate whether additional system information is transmitted or not. A TX indicator set to '0' may indicate that no additional system information is transmitted while the basic system information is being transmitted, and a TX indicator set to '1' may indicate that additional system information is transmitted while the basic system information is being transmitted. Alternatively, a TX indicator set to '0' may indicate that there is no additional system information corresponding to the basic system information, and a TX indicator set to '1' may indicate that there is additional system information corresponding to the basic system information. If it is identified that the TX indicator of the basic system information is set to '1', the terminal may perform a reception operation of the additional system information, and may not transmit a RA preamble because it is not necessary to request transmission of the additional system information. If the reception of the additional system information fails, the terminal may request transmission of the additional system information by transmitting a RA preamble to the base station. On the other hand, if it is identified that the TX indicator of the basic system information is set to '0', the terminal may not perform the reception operation of the additional system information, and may request broadcasting of the additional system information by transmitting a RA preamble.

System Information Transmission and Reception Based on Update Indicator

For broadcasting of changed system information (e.g., basic system information or additional system information) or additional system information which is not yet broadcasted, the base station may use a paging channel to inform terminals that the system information has been changed or the system information is being broadcasted. The paging channel may be broadcasted by using a field indicating one or more system information (e.g., all system information), and the terminal receiving the paging channel may perform a procedure of receiving the corresponding system information.

In the case that the paging channel indicates whether the additional system information is broadcasted or whether the additional system information has been changed, the terminal cannot identify whether the additional system information is broadcasted or has been changed when the paging channel is not received. In order to solve such the problem, the basic system information may further include an update indicator indicating whether the additional system information has been changed or not. An update indicator set to '0' may indicate that additional system information has not been changed or is not broadcast, and an update indicator set to '1' may indicate that additional system information has been changed or is broadcasted. If it is identified that the update indicator of the basic system information is set to '1', the terminal may receive additional system information through a resource indicated by the basic system information. If it is identified that the update indicator is set to '1', the terminal may not transmit a RA preamble because the terminal determines that the base station will broadcast additional system information. That is, the update indicator may indicate that the base station will broadcast the additional system information at a later time, and the terminal may identify that the system information will be broadcasted from the base station after a predetermined time based on the update indicator, so that unnecessary RA preamble transmission can be prevented. On the other hand, when it is identified that the update indicator of the basic system information is set to '0', the terminal may perform a transmission operation of a RA preamble when the additional system information is needed.

System Information Transmission and Reception Based on SI Scheduling Information In the communication system, SI scheduling information including the type of additional system information (e.g., SIB, MIB, etc.), transmission resource information, and the like may be used.

Figure 10:
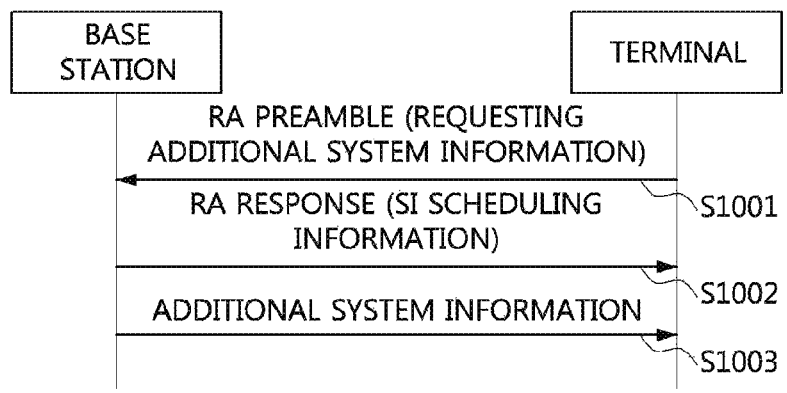
FIG. 10 is a timing diagram for explaining a second embodiment of a method for transmission and reception of additional system information.

FIG. 10 is a timing diagram for explaining a second embodiment of a method for transmission and reception of additional system information.

Referring to FIG. 10, a communication system may include a base station, a terminal, and the like. The base station may be the same as or similar to the base stations 110-1, 110-2, 110-3, 120-1, and 120-2 shown in FIG. 1, and the terminal may be the same as or similar to the terminals 130-2, 130-3, 130-4, 130-5, and 130-6. Also, each of the base station and the terminal may be configured to be the same as or similar to the communication node 200 shown in FIG. 2.

The terminal may generate a RA preamble for requesting transmission of the additional system information, and may transmit the generated RA preamble to the base station (S1001). The base station may receive the RA preamble from the terminal, and identify that the transmission of the additional system information is requested based on the received RA preamble. Thus, the base station may generate SI scheduling information for the additional system information (e.g., at least one sub-additional system information). The base station may transmit a RA response including the SI scheduling information (S1002), and may transmit the additional system information through the resource indicated by the SI scheduling information (S1003).

The terminal may receive the RA response from the base station, and identify the SI scheduling information included in the RA response. Accordingly, the terminal may receive the additional system information through the resource indicated by the SI scheduling information.

Alternatively, the base station may generate additional system information including the SI scheduling information, etc., and may transmit the additional system information in the RA response. In this case, the SI scheduling information may be located in the front part of the additional system information. The terminal may receive the SI scheduling information in response to the RA preamble, and may identify the type and transmission resource information of the additional system information, etc. based on the received SI scheduling information. The terminal may receive the additional system information through the resource indicated by the SI scheduling information.

Specifically, the SI scheduling information may be configured as a bitmap, and in this case, the bitmap may indicate whether the additional system information is broadcasted. In a case that the SI scheduling information is not included in the RA response, the terminal may receive the corresponding additional system information after identifying information on the broadcasting of the additional system information based on the additional system information included in the basic system information.

State Transition of Terminal

Hereinafter, a state transition method of a terminal in a communication system will be described.

Figure 11:
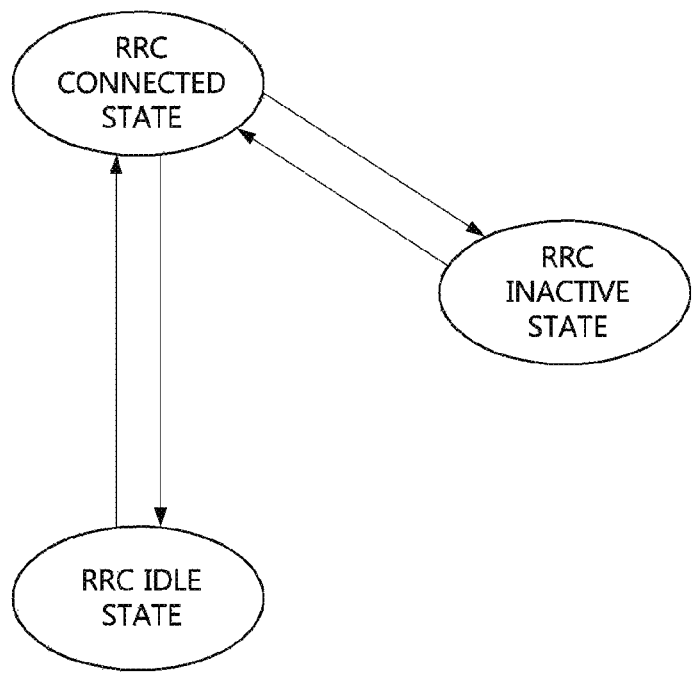
FIG. 11 is a conceptual diagram illustrating an operation state of a terminal in a communication system.

FIG. 11 is a conceptual diagram illustrating an operation state of a terminal in a communication system.

Referring to FIG. 11, the operation state of the terminal may be classified into an RRC idle state, an RRC connected state, and an RRC inactive state. The RRC inactive state may be referred to as a 'radio access network (RAN) controlled state'. The RRC idle state may indicate that the terminal is not connected to the base station. In the RRC idle state, the base station may not manage unique information of the terminal (e.g., UE context information). The terminal operating in RRC idle state may receive system information, a paging channel, etc. from a base station, and may perform a cell search procedure, a cell selection procedure, etc. However, the terminal operating in RRC idle state may not transmit and receive a data unit. After the operation state of the terminal is transitioned from the RRC idle state to the RRC connected state according to the RA procedure, an operation of transmitting and receiving a data unit may be performed.

The RRC connected state may indicate a state where the terminal has connected to the base station. In the RRC connected state, the base station may manage the unique information (e.g., UE context information) of the terminal and the unique identifier (e.g., the UE ID) of the terminal, and perform data transmission and reception with the terminal based on scheduling operation. The terminal operating in the RRC connected state may receive a control channel from the base station, and may transmit and receive a data unit based on the scheduling of the base station. Also, the terminal operating in the RRC connected state may identify a channel state, a beamforming state, and the like by performing a measurement procedure, and may transmit channel state information, beamforming state information, and the like to the base station. A handover procedure between the terminal and the base station may be performed when the terminal moves to a neighboring base station (for example, a neighboring cell) in the RRC connected state.

The RRC inactive state may indicate a state in which the terminal is connected to the base station. For example, the operation state of the terminal may transition from the RRC connected state to the RRC inactive state. In this case, a RRC connection link established between the base station and the terminal in the RRC connected state may be inactivated. When the operation state of the terminal transits from the RRC inactive state to the RRC connected state, the inactivated RRC connection link may be resumed. In the RRC inactive state, the base station may manage unique information of the terminal (e.g., UE context information). However, the base station may not perform scheduling operation of transmitting/receiving data units for the terminal in the RRC inactive state.

The terminal operating in the RRC inactive state may receive system information, a paging channel, and the like from the base station. A cell search procedure, a cell selection procedure, and the like may be performed when the terminal moves to a neighboring base station (e.g., a neighboring cell) in the RRC inactive state. That is, a cell search procedure, a cell selection procedure, and the like may be performed in place of a handover procedure in order to support mobility of the terminal operating in the RRC inactive state. When the operation state of the terminal transits from the RRC inactive state to the RRC connected state, data transmission/reception operation based on scheduling of the base station may be performed. Alternatively, the terminal operating in the RRC inactive state may transmit a data unit using a RA procedure even without performing a state transition operation.

State Transition from RRC Connected State to RRC Idle or Inactive State

The operation state of the terminal may transition from the RRC connected state to the RRC idle state or the RRC inactive state. When the terminal is initially connected to the base station based on a RA procedure, the base station may configure a transition path of the operation state of the terminal. For example, the terminal may inform the base station of information on a type of service provided by the terminal in the access procedure between the base station and the terminal, and the base station may configure set a transition path of the operation state of the terminal based on the obtained information on the type of service provided by the terminal.

For example, in a case that a service requiring a fast access (e.g., a low latency service) should be performed by the terminal, the base station may configure a transition path from the RRC connected state to the RRC inactive state. On the other hand, in a case that the terminal does not support the low latency service or operates in a power saving mode, the base station may configure a transition path from the RRC connected state to the RRC idle state. The base station may inform the terminal of the configured transition path, and the terminal may perform a state transition operation based on the configured transition path received from the base station.

Also, the base station may determine a value of a timer indicating a time point at which the state transition operation of the terminal is performed according to the information on the type of service. In this case, the base station may inform the terminal of the value of the timer as well as the configured transition path, and the terminal may receive information on the configured transition path and the value of the timer from the base station. When a timer configured based on the value of the timer expires, the terminal may perform the state transition operation based on the configured transition path received from the base station.

State Transition from RRC Inactive State to RRC Connected State

The operation state of the terminal may be transited from the RRC inactive state to the RRC connected state. The state transition operation from the RRC in active state to the RRC connected state may be performed according to a request of the terminal or a request of the base station.

1) State Transition Operation According to a Request of Terminal

The terminal may obtain information for a RA procedure in an initial access procedure between the base station and the terminal. The information for the RA procedure may include a time and frequency resource for transmitting a RA preamble, preamble sequence information of the RA preamble, a time and frequency resource for a RA response, beamforming information, and the like. The information for the RA procedure may be valid for a predetermined time, and information for the RA procedure may be initialized when the predetermined time has elapsed. The terminal operating in the RRC inactive state may generate the RA preamble based on the preamble sequence information, and transmit the generated RA preamble to the base station through the time and frequency resource so as to request the base station to perform a state transition operation from the RRC inactive state to the RRC connected state. Here, the RA preamble may request resumption of the RRC connection link established in the initial access procedure between the base station and the terminal.

When the RA preamble is received from the terminal operating in the RRC inactive state, the base station may determine that it is requested to perform the state transition operation from the RRC inactive state to the RRC connected state. Then, the base station may generate a RA response based on the RA preamble received from the terminal, and transmit the generated RA response to the terminal. The terminal may receive the RA response from the base station, and check whether a transmission and reception of the RA response is successful or not by comparing a preamble sequence of the received RA preamble with a preamble sequence in the RA response. Here, the RA response may instruct to resume the RRC connection link established in the initial access procedure between the base station and the terminal, and the terminal receiving the RA response may perform a resumption procedure of the RRC connection link.

In a case that the transmission and reception of the RA response has been successfully performed (for example, when the preamble sequence of the RA preamble is the same as the preamble sequence in the RA response), a transmission and reception procedure of a UL signaling message between the base station and the terminal (e.g., S603 of FIG. 6 or S706 of FIG. 7) and a transmission and reception procedure of a DL signaling message (e.g., S604 of FIG. 6 or S707 of FIG. 7) may be performed. In a case that the transmission and reception of the UL signaling message and the DL signaling message has been successfully performed, the operation state of the terminal may transition from the RRC inactive state to the RRC connected state.

Alternatively, the transmission and reception procedure of the UL signaling message and the DL signaling message may be omitted. In this case, the terminal that has completed the resumption procedure of the RRC connection link may transmit to the base station a message indicating the completion of the resumption procedure of the RRC connection link. The base station may receive the message indicating the completion of the resumption procedure of the RRC connection link from the terminal, and determine that the resumption procedure of the RRC connection link has been completed based on the received message. In the case that the transmission and reception procedure of the message indicating the completion of the resumption procedure of the RRC connection link has been successfully performed, the operation state of the terminal may transition from the RRC inactive state to the RRC connected state.

On the other hand, in a case that the transmission and reception procedure of the RA response has not been successfully performed (for example, when the preamble sequence of the RA preamble is different from the preamble sequence in the RA response), the terminal may connect to the base station by using a conventional contention-based RA procedure. After the access procedure between the terminal and the base station is completed, the operation state of the terminal may transition from the RRC inactive state to the RRC connected state.

2) State Transition Operation According to a Request of Base Station

The base station may request the base station to perform the state transition operation from the RRC inactive state to the RRC connected state by transmitting a paging channel to the terminal. Information for transmission of the paging channel may be configured in the initial access procedure between the base station and the terminal, and information for transmission of the paging channel may be shared between the base station and the terminal. Alternatively, information for transmission of the paging channel may be transmitted from the base station to the terminal through the system information. The information for transmission of the paging channel may include a time and frequency resource for the paging channel, a transmission period of the paging channel, a terminal identifier, beamforming information (e.g., beamforming information for a RA procedure), a preamble sequence of the RA preamble, and the like.

The paging channel may be classified into a plurality of sub-paging channels (e.g., sub-paging channel #1, sub-paging channel #2, etc.). For example, a sub-paging channel #1 may include a terminal identifier or the like, and a sub-paging channel #2 may include IEs not included in the sub-paging channel #1. In this case, the base station may transmit the sub-paging channel #2 after transmitting the sub-paging channel #1. The information for transmission of the paging channel may be valid for a predetermined time, and information for transmission of the paging channel may be initialized when a predetermined time has elapsed.

The terminal may estimate a position of the paging channel using a terminal identifier (e.g., C-RNTI, Temporary Mobile Subscriber Identity (TMSI), etc.) according to a predetermined rule (e.g., a hash rule), and receive the paging channel at the estimated position. Alternatively, the UE may identify the position of the paging channel based on the information or system information configured in the initial access procedure between the base station and the terminal, and receive the paging channel at the identified position.

The terminal receiving the paging channel from the base station may determine that it is requested to perform the state transition operation from the RRC inactive state to the RRC connected state, and identify the IEs included in the paging channel. When the sub-paging channel #1 and the sub-paging channel #2 are used, the terminal may receive the sub-paging channel #1 from the base station. If the terminal identifier included in the sub-paging channel #1 is the same its own identifier, the terminal may receive the sub-paging channel #2, and identify the IEs included in the sub-paging channel #2.

In a case that the transmission and reception procedure of the paging channel (or, sub-paging channel #1 and sub-paging channel #2) is completed, a RA procedure between the base station and the terminal may be performed. The RA procedure may be performed based on information obtained in the transmission and reception procedure of the paging channel, information for the RA procedure configured in the initial access procedure between the base station and the terminal, and the like. The information for the RA procedure may include a time and frequency resource for a RA preamble, information on a preamble sequence of the RA preamble, a time and frequency resource for a RA response, beamforming information, and the like. The information for the RA procedure may be valid for a predetermined time, and information for the RA procedure may be initialized when the predetermined time has elapsed.

In the RA procedure, the terminal operating in the RRC inactive state may generate a RA preamble based on the information on the preamble sequence, and transmit the generated RA preamble to the base station through the time and frequency resource. Here, the RA preamble may request the resumption of the RRC connection link established in the initial access procedure between the base station and the terminal.

The base station may receive the RA preamble from the terminal operating in the RRC inactive state, generate a RA response based on the received RA preamble, and transmit the generated RA response to the terminal. The terminal may receive the RA response from the base station, and check whether a transmission and reception of the RA response is successful or not by comparing a preamble sequence of the received RA preamble with a preamble sequence in the RA response. Here, the RA response may instruct to resume the RRC connection link established in the initial access procedure between the base station and the terminal, and the terminal receiving the RA response may perform a resumption procedure of the RRC connection link.

In a case that the transmission and reception of the RA response has been successfully performed (for example, when the preamble sequence of the RA preamble is the same as the preamble sequence in the RA response), a transmission and reception procedure of a UL signaling message between the base station and the terminal (e.g., S603 of FIG. 6 or S706 of FIG. 7) and a transmission and reception procedure of a DL signaling message (e.g., S604 of FIG. 6 or S707 of FIG. 7) may be performed. In a case that the transmission and reception of the UL signaling message and the DL signaling message has been successfully performed, the operation state of the terminal may transition from the RRC inactive state to the RRC connected state.

Alternatively, the transmission and reception procedure of the UL signaling message and the DL signaling message may be omitted. In this case, the terminal that has completed the resumption procedure of the RRC connection link may transmit to the base station a message indicating the completion of the resumption procedure of the RRC connection link. The base station may receive the message indicating the completion of the resumption procedure of the RRC connection link from the terminal, and determine that the resumption procedure of the RRC connection link has been completed based on the received message. In the case that the transmission and reception procedure of the message indicating the completion of the resumption procedure of the RRC connection link has been successfully performed, the operation state of the terminal may transition from the RRC inactive state to the RRC connected state.

On the other hand, in a case that the transmission and reception procedure of the RA response has not been successfully performed (for example, when the preamble sequence of the RA preamble is different from the preamble sequence in the RA response), the terminal may connect to the base station by using a conventional contention-based RA procedure. After the access procedure between the terminal and the base station is completed, the operation state of the terminal may transition from the RRC inactive state to the RRC connected state.

State Transition Operation from RRC Inactive State to RRC Idle State

The state transition operation from the RRC inactive state to the RRC idle state may be performed at a request of base station. For example, the base station may generate a paging channel including an indicator requesting to perform a state transition operation from the RRC inactive state to the RRC idle state, and transmit the generated paging channel. The terminal receiving the paging channel may determine that it is requested to perform the state transition operation from the RRC inactive state to the RRC idle state, and the operation state of the terminal may transition from the RRC inactive state to the RRC idle state. In this case, the base station may delete the unique information of the terminal (e.g., UE context information), and the RRC connection link established between the base station and the terminal may be released.

Alternatively, the indicator requesting to perform the state transition operation from the RRC inactive state to the RRC idle state may be transmitted to the terminal in the RA procedure instead of the transmission procedure of the paging channel. For example, the base station may transmit the paging channel, and the terminal receiving the paging channel may transmit a RA preamble to the base station. The base station may receive the RA preamble from the terminal, and transmit to the terminal a RA response including the indicator requesting to perform the state transition operation from the RRC inactive state to the RRC idle state. The terminal may receive the RA response from the base station, and determine that it is requested to perform the state transition operation from the RRC inactive state to the RRC idle state based on the received RA response.

Alternatively, the indicator requesting to perform the state transition operation from the RRC inactive state to the RRC idle state may be transmitted to the terminal through the DL signaling message transmitted after the RA response instead of the RA response. Accordingly, the terminal may determine that the state transition operation from the RRC inactive state to the RRC idle state is requested while the RA procedure is being performed, and the terminal may transition from the RRC inactive state to the RRC idle state. In this case, the base station may delete unique information of the terminal (e.g., UE context information), and the RRC connection link established between the base station and the terminal may be released.

State Transition Operation from RRC Idle State to RRC Connected State

The terminal operating in the RRC idle state may perform the RA procedure shown in FIG. 6 or the RA procedure shown in FIG. 7, and when the RA procedure is successfully completed, the operation state of the terminal may be changed from the RRC idle state to the RRC connected state.

Method of Supporting Mobility of a Terminal Operating in the RRC Inactive State

Hereinafter, mobility support methods for a terminal operating in the RRC inactive state in a communication system will be described.

Figure 12:
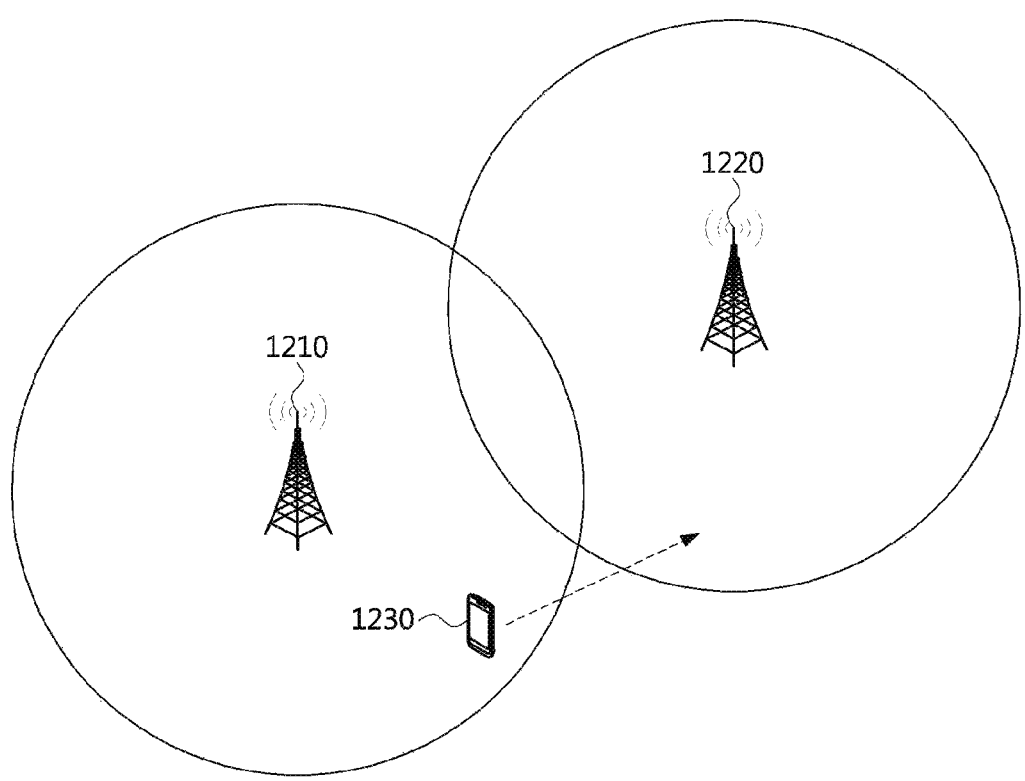
FIG. 12 is a conceptual diagram illustrating a second embodiment of a communication system.

FIG. 12 is a conceptual diagram illustrating a second embodiment of a communication system.

Referring to FIG. 12, a communication system may comprise a first base station 1210, a second base station 1220, a terminal 1230, and the like. The terminal 1230 may belong to cell coverage of the first base station 1210, and may operate in the RRC inactive state after an access procedure between the terminal 1230 and the first base station 1210 is completed. In this case, the terminal 1230 may receive system information, a paging channel, and the like from the first base station 1210, and the first base station 1210 may manage unique information of the terminal 1230 (e.g., UE context information). Also, a RRC connection link established between the first base station 1210 and the terminal 1230 may be in an inactive state.

Meanwhile, the terminal 1230 may move from the cell coverage of the first base station 1210 to cell coverage of the second base station 1220. In this case, signal strength from the second base station 1220 may be greater than signal strength from the first base station 1210. If a difference between the signal strength from the second base station 1220 and the signal strength from the first base station 1210 is greater than or equal to a preset threshold value, the terminal 1230 may perform a RA procedure (e.g., the RA procedure shown in FIG. 6 or the RA procedure shown in FIG. 7) with the second base station 1220.

In the RA procedure between the terminal 1230 and the second base station 1220, the terminal 1230 may generate a RA preamble using a preamble sequence set by the second base station 1220, and transmit the RA preamble to the second base station 1220. Then, the second base station 1220 may receive the RA preamble from the terminal 1230, and transmit a RA response to the terminal 1230 in response to the RA preamble. If the RA response is successfully received from the second base station 1220, the terminal 1230 may generate an UL signaling message including a terminal identifier, a previous cell identifier (i.e., a cell identifier of the first base station 1210), a beam identifier, etc., and transmit the generated UL signaling message to the second base station 1220.

The second base station 1220 may receive the UL signaling message from the terminal 1230, and check whether the unique information of the terminal 1230 (e.g., UE context information) exists in the second base station 1220 based on the information (e.g., the terminal identifier) included in the UL signaling message. In a case that the unique information of the terminal 1230 does not exist in the second base station 1220, the second base station 1220 may request transmission of the unique information of the terminal 1230 to the first base station 1210 or the core network. Accordingly, the second base station 1220 may obtain the unique information of the terminal 1230 from the first base station 1210 or the core network, and manage the obtained unique information of the terminal 1230. Also, the second base station 1220 may transmit to the first base station 1210 a message requesting to release the RRC connection link established between the first base station 1210 and the terminal 1230. The first base station 1210 may receive the message requesting to release the RRC connection link, and release the RRC connection link between the first base station 1210 and the terminal 1230 based on the received message.

When the reception of the UL signaling message is completed, the second base station 1220 may generate a DL signaling message and transmit the generated DL signaling message to the terminal 1230. The terminal 1230 may receive the DL signaling message from the second base station 1220, and identify the IEs included in the received DL signaling message. When the RA procedure between the terminal 1230 and the second base station 1220 is completed, the terminal 1230 may operate in the RRC connected state or the RRC inactive state based on the control of the second base station 1220.

Meanwhile, the terminal 1230 may not receive a signal having a strength equal to or greater than a predetermined threshold value from the base stations 1210 and 1220. In this case, the operation state of the terminal 1230 may be changed from the RRC inactive state (or the RRC connected state) to the RRC idle state. Also, the base stations 1210 and 1220 may delete the unique information of the terminal 1230 when a signal is not received from the terminal 1230 during a predetermined time.

Data Unit Transmission and Reception Based on RA Procedure

In the communication system, methods of transmitting and receiving a data unit performed in a terminal operating in the RRC inactive state are required.

Figure 13:
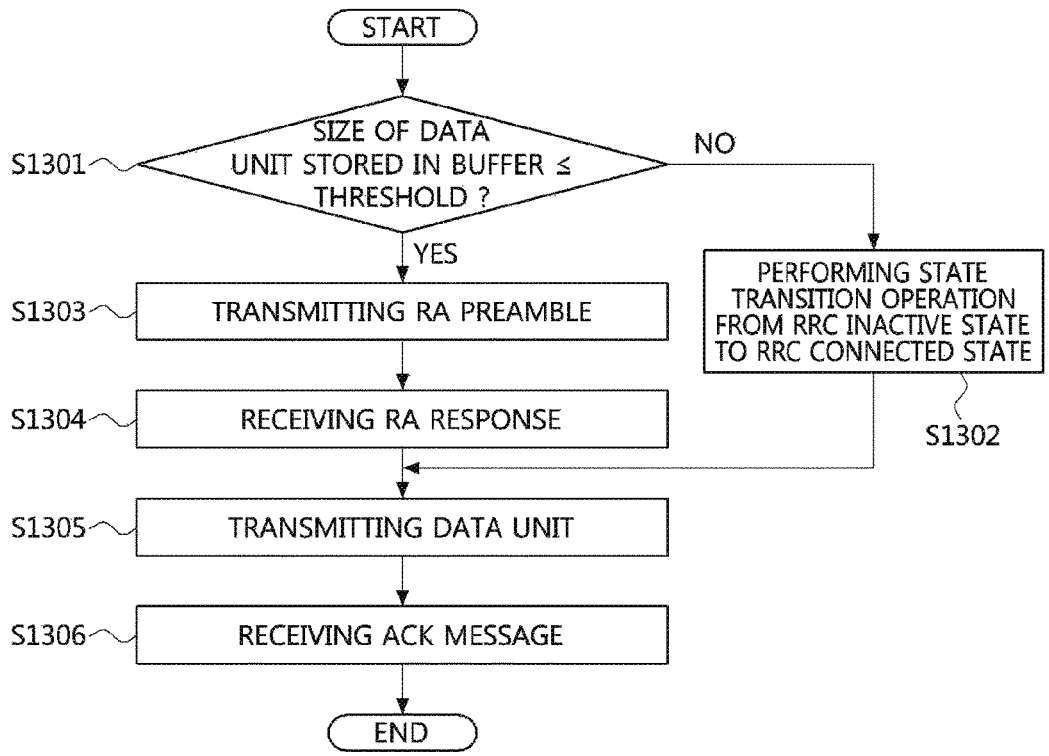
FIG. 13 is a flow chart explaining a first embodiment of a method of transmitting and receiving data units based on a RA procedure.

FIG. 13 is a flow chart explaining a first embodiment of a method of transmitting and receiving data units based on a RA procedure.

Referring to FIG. 13, the terminal may operate in the inactive state. The terminal may compare the size of the data unit stored in a transmission buffer with a predetermined threshold (S1301). If the size of the data unit stored in the transmission buffer of the terminal is larger than the predetermined threshold value, the terminal may perform a state transition operation from the RRC inactive state to the RRC connected state (S1302). When the state transition operation is completed, the operation state of the terminal may transition from the RRC inactive state to the RRC connected state. The terminal operating in the RRC connected state may transmit a scheduling request (SR) indicator for uplink data unit transmission to the base station.

The base station receiving the scheduling request indicator may configure a uplink resource for the terminal, and transmit a uplink grant including information on the uplink resource to the terminal. The terminal may receive the uplink grant from the base station, and transmit the data unit to the base station through the resource indicated by the uplink grant (S1305). The base station may receive the data unit from the terminal, and may transmit an acknowledgment (ACK) message to the terminal in response to the data unit if the data unit is successfully received. The terminal may receive the ACK message for the data unit from the base station (S1306), and determine that the data unit has been successfully received from the base station based on the ACK message.

On the other hand, when the size of the data unit stored in the transmission buffer of the terminal is equal to or less than the preset threshold value, the terminal operating in the RRC inactive state may transmit the data unit based on a RA procedure without the state transition from the RRC inactive state to the RRC connected state.

For example, the terminal may generate a RA preamble based on preamble sequence information (e.g., a preamble sequence subset) configured by the base station. The RA preamble may indicate a scheduling request for data unit uplink transmission. For example, the RA preamble may include a scheduling request indicator for uplink transmission of a data unit. A preamble sequence for indicating the scheduling request for uplink transmission of data units between the terminal and the base station may be set in advance, and the RA preamble may be set based on the preamble sequence indicating the scheduling request for uplink transmission of data units.

Also, the RA preamble may further include an indicator indicating the size of the data unit to be transmitted by the terminal (for example, the size of the data unit stored in the transmission buffer of the terminal). The data unit to be transmitted by the terminal (for example, the data unit stored in the transmission buffer of the terminal) may be referred to as an 'uplink data unit'. Alternatively, a preamble sequence indicating the size of the uplink data unit between the terminal and the base station may be set in advance. For example, a preamble sequence #1 may indicate that the size of the uplink data unit is 1 RB, a preamble sequence #2 may indicate that the size of the uplink data unit is 2 RBs, and a preamble sequence #3 may indicate that the size of the uplink data unit is 3 RBs. Accordingly, the RA preamble may be set based on the preamble sequence indicating the size of the uplink data unit.

Alternatively, the indicator indicating the size of the uplink data unit may be transmitted through a message separate from the RA preamble. A message including the indicator indicating the size of the uplink data unit may be transmitted from the terminal to the base station via a control channel (e.g., PUCCH) or a data channel (e.g., PUSCH). In this case, the RA preamble may include information on a time and frequency resource through which the message including the indicator indicating the size of the uplink data unit is transmitted.

The terminal may transmit the RA preamble through a resource (e.g., PRACH) preset by the base station (S1303). The RA preamble may request scheduling for uplink transmission of the data unit. In addition, the RA preamble may further include the indicator for indicating the size of the uplink data unit. If the indicator indicating the size of the uplink data unit is not included in the RA preamble, the terminal may transmit a message including the indicator indicating the size of the uplink data unit after transmission of the RA preamble.

When a beamforming (for example, a beam sweep scheme) is applied to the RA procedure, the terminal may repeatedly transmit the RA preamble based on a beamforming periodicity. In this case, the same RA preamble may be repeatedly transmitted using the same resource.

The base station may receive the RA preamble from the terminal, and identify that the scheduling for uplink transmission of the data unit is requested based on the received RA preamble. Also, the base station may obtain the indicator indicating the size of the uplink data unit included in the RA preamble (or the preset preamble sequence) or the indicator indicating the size of the uplink data unit included in the separate message, and identify the size of the uplink data unit based on the obtained indicator (or preamble sequence). When a beamforming scheme (for example, a beam sweep scheme) is applied to the RA procedure, the base station may receive a plurality of RA preambles, and identify the scheduling request and the size of the uplink data unit based on a RA preamble having the largest signal strength among the plurality of received RA preambles.

If the RA preamble is successfully received from the terminal, the base station may generate a RA response. The RA response may include uplink grant information (e.g., uplink resource information), TA, a terminal identifier (e.g., a temporary identifier used to distinguish the terminal transmitting the RA preamble from other terminals), etc. The uplink grant information may include a time and frequency resource allocated for transmitting the uplink data unit, transmission power information, transmission time information, and beamforming information of the uplink data unit, and the like. The time and frequency resource allocated for transmitting the uplink data unit may be set based on the indicator (or preamble sequence) indicating the size of the uplink data unit received from the terminal. Alternatively, in a case where the resource for transmitting the uplink data unit is preset in the initial access procedure between the terminal and the base station, the information on the time and frequency resource for transmitting the uplink data unit may be omitted from the uplink grant information.

The base station may transmit the RA response to the terminal through a predetermined resource (e.g., a resource mapped to the received RA preamble). The RA response may be transmitted based on the beamforming scheme. The terminal may receive the RA response from the base station (S1304). The terminal may compare the preamble sequence of the RA preamble with the preamble sequence in the RA response, and determine that the transmission and reception of the RA response has been successfully completed when the preamble sequence of the RA preamble is the same as the preamble sequence of the RA response. In this case, the terminal may identify the IEs included in the RA response (e.g., the uplink grant information, the TA, the terminal identifier, etc.). On the other hand, if the RA response is not received from the base station for a preset time, the terminal may retransmit the RA preamble.

The terminal may generate a data unit based on a predetermined data unit size or the size of the time and frequency resource indicated by the RA response. The terminal may transmit a message including the data unit to the base station through the resource allocated by the base station (S1305). In addition, the message may further include information indicating the state of the transmission buffer of the terminal as well as the data unit. In addition, the message may further include not only the data unit but also information indicating that the transmission of the data unit is completed (for example, information indicating that any more uplink data unit is not present in the terminal).

The base station may receive the message including the data unit from the terminal. If the data unit is successfully received, the base station may transmit an ACK message to the terminal for the data unit. The terminal may receive the ACK message for the data unit from the base station (S1306), and determine that the data unit has been successfully received at the base station based on the ACK message.

Also, if the message received from the terminal includes information indicating the state of the transmission buffer of the terminal, and the information indicating the state of the transmission buffer of the terminal indicates that an uplink data unit exists in the terminal, the base station may allocate an uplink resource for transmission of the uplink data unit existing in the transmission buffer of the terminal. The base station may transmit uplink grant information including information on the uplink resource to the terminal. In this case, the terminal may transmit the uplink data unit to the base station based on the uplink grant information. If an uplink data unit does not exist in the transmission buffer of the terminal, the terminal may terminate the transmission and reception procedure of the data unit based on the RA procedure.

Also, when the message received from the terminal includes information indicating that the transmission of the data unit is completed, the base station may terminate the transmission and reception procedure of the data unit based on the RA procedure.

RA Procedure Based on Beamforming

A RA procedure between the base station and the terminal may be performed based on a beamforming (e.g., a beam sweep scheme).

Figure 14:
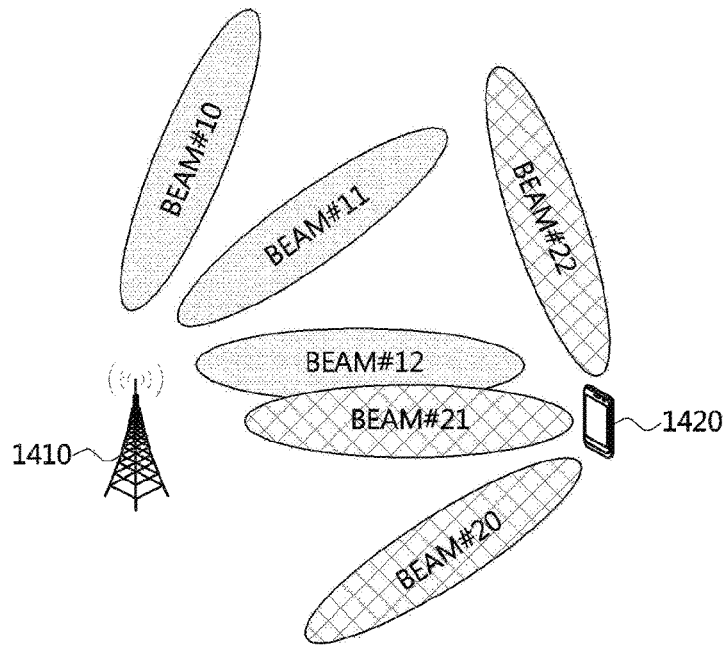
FIG. 14 is a conceptual diagram illustrating a third embodiment of a communication system.

FIG. 14 is a conceptual diagram illustrating a third embodiment of a communication system, FIG. 15 is a timing diagram for explaining a first embodiment of a beamforming transmission performed by a base station in the communication system illustrated in FIG. 14, and FIG. 16 is a timing diagram for explaining a first embodiment of a beamforming transmission performed by a terminal in the communication system illustrated in FIG. 14.

Referring to FIGS. 14 to 16, a communication system may comprise a base station 1410, a terminal 1420, and the like. Each of the base station 1410 and the terminal 1420 may support a beamforming (e.g., a beam sweep scheme). For example, the base station 1410 may use three beams (e.g., beam #10, beam #11, and beam #12) to provide communication services to terminals belonging to its cell coverage. For example, base station 1410 may transmit a signal in a subframe #0 using the beam #10, transmit a signal in a subframe #1 using the beam #11, and transmit a signal using a subframe #2 using the beam #12. The same signal may be transmitted through each of the three beams in a single transmission period (e.g., subframes #0 to #2). Here, the signal may be system information, control information, reference signal, synchronization signal, paging signal, downlink data unit, and the like. A downlink transmission operation and an uplink reception operation of the base station based on the beamforming may be performed in one subframe. That is, the signal transmission and reception operations may be performed in the same subframe.

The terminal 1420 may use three beams (e.g., beam #20, beam #21, and beam #22). For example, the terminal 1420 may transmit a signal in the subframe #0 using the beam #20, transmit a signal in the subframe #1 using the beam #21, and transmit a signal using the subframe #2 using the beam #22. The same signal may be transmitted through each of the three beams in a single transmission period (e.g., subframes #0 to #2). Here, the signal may be control information, reference signal, uplink data unit, and the like.

1) System Information Transmission and Reception

The base station 1410 may generate system information. The system information may include an indicator indicating whether beamforming is supported, the number (e.g., three) of beams used by the base station 1410, a beam index, and the like. For example, the beam index of the beam #10 may be set to '10', the beam index of the beam #11 may be set to '11', and the beam index of the beam #12 may be set to '12'.

In a case that a transmission period of the system information is one radio frame and the system information is transmitted based on the beamforming scheme in the subframes #0 to #2, the base station 1410 may transmit the system information in each subframe #0 of each radio frame by using the beam #10, transmit the system information in each subframe #1 of each radio frame by using the beam #11, and transmit the system information in each subframe #2 of each radio frame by using the beam #12. The beam index included in the system information of the beam #10 may be set to '10', the beam index included in the system information of the beam #11 may be set to '11', and the beam index included in the system information of the beam #12 may be set to '12'. A reference time of the base station 1410 may be set as a time at which the base station 1410 transmits the first beam (e.g., beam #10).

The terminal 1420 may receive the system information from the base station 1410, and identify IEs included in the received system information. Since the strength of the signal received through the beam #12 among the beams of the base station 1410 is the greatest, the terminal 1420 may determine the beam #12 as a beam used for communications between the base station 1410 and the terminal 1420, and inform the base station 1410 of the beam index (i.e., '12') of the beam #12. Also, since the communications based on the beam #12 of the base station 1410 is performed in the subframe #2, the terminal 1420 may determine that downlink communication and uplink communication are possible in the subframe #2. Accordingly, the terminal 1420 may transmit a RA preamble through the subframe #2.

Also, a reception beam of the terminal 1420 may be determined in the system information reception procedure. For example, the terminal 1420 may receive the system information using all beams (e.g., the beam #20, the beam #21, and the beam #22). However, since the strength of the signal received via the beam #21 is the largest, the terminal 1420 may determine the beam #21 as a beam (i.e., reception beam) used for communication between the base station 1410 and the terminal 1420. Thus, a pair of beams used for communications between the base station 1410 and the terminal 1420 may be determined as the beam #12 and the beam #21. The terminal 1420 may inform the base station 1410 of the beam index of the beam #21 (i.e., '21') and communicate with the base station 1410 using the beam #21.

2) Paging Channel Transmission and Reception

In a case that the terminal 1420 is a terminal without mobility, the base station 1410 may transmit a paging channel based on the beam pair (e.g., the beam #12 and the beam #21) determined according to the system information transmission and reception procedure. For example, the base station 1410 may transmit a paging channel using the beam #12. However, if a response to the paging channel is not received from the terminal 1420 for a predetermined time, the base station 1410 may transmit the paging channel using all the beams (e.g., the beam #10, the beam #11, and the beam #12).

3) RA Procedure

The terminal 1420 may transmit a RA preamble through the subframe #2 determined in the system information transmission and reception procedure. In this case, the terminal 1420 may repeatedly transmit the RA preamble using all of the beams (e.g., the beam #20, the beam #21, and the beam #22). The RA preamble may include a beam index. For example, the beam index included in the RA preamble of the beam #20 may be set to '20', the beam index included in the RA preamble of the beam #21 may be set to '21', and the beam index included in the RA preamble of the beam #22 may be set to '22'.

Alternatively, the terminal 1420 may transmit the RA preamble using the beam #21 belonging to the beam pair determined in the system information transmission and reception procedure. However, if a valid period of the beam pair has elapsed, the terminal 1420 may repeatedly transmit the RA preamble using all of the beams (e.g., the beam #20, the beam #21, and the beam #22).

The base station 1410 may receive the RA preamble from the terminal 1420. In a case that the system information of the base station 1410 is transmitted in the subframe #2 using beam #12 and the RA preamble of terminal 1420 is received in the subframe #2, the base station 1410 may determine the beam #12 as a beam used for communications between the terminal 1410 and the terminal 1420. When a plurality of RA preambles are received from the terminal 1420, the base station 1410 may determine a beam (e.g., the beam #21) through which a RA preamble having the greatest strength among the plurality of RA preambles is received as a beam used for communications between the terminal 1410 and the terminal 1420. Alternatively, when a single RA preamble is received from the terminal 1420, the base station 1410 may determine a beam (e.g., the beam #21) through the RA preamble is received as a beam used for communications between the base station 1410 and the terminal 1420.

In a case that the RA preamble has been successfully received, the base station 1410 may generate a RA response. The RA response may include uplink resource information, TA information, information on a preamble sequence, information on a beam index, and the like. The information on the preamble sequence may include the preamble sequence of the RA preamble received at the base station 1410. The beam index may be a beam index (e.g., '21') of the beam through which the RA preamble is received at the base station 1410. The base station 1410 may transmit the RA response using the beam #12.

The terminal 1420 may receive the RA response from the base station 1410, and identify IEs included in the received RA response. The terminal 1420 may transmit data units or control information via an uplink resource indicated by the RA response.

On the other hand, if the RA response is not received from the base station 1410 within a predetermined time, the terminal 1420 may retransmit the RA preamble using the beam #21. For example, the terminal 1420 may retransmit the RA preamble by the predetermined number of retransmissions. Alternatively, the terminal 1420 may repeatedly transmit the RA preamble for a time corresponding to a preconfigured timer. In such the retransmission procedure of the RA preamble, a transmission power of the RA preamble may be configured to be higher than a transmission power of a previous RA preamble transmitted in the previous RA transmission procedure. If no RA response is received even in the retransmission procedure of the RA preamble, the terminal 1420 may repeatedly transmit the RA preamble using all of the beams (e.g., the beam #20, the beam #21, and the beam #22). In the retransmission procedure of the RA preamble, the terminal 1420 may reacquire the reference time of the base station 1410 by receiving a signal of the base station 1410.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a base station in a communication system, comprising:
   transmitting, to a terminal, first downlink control information (DCI) including a system information-radio network temporary identifier (SI-RNTI) through a first physical downlink control channel (PDCCH);
   transmitting, to the terminal, system information (SI) which includes information indicating a format of second DCI for a random access procedure and sequence information of a random access preamble through a physical downlink shared channel (PDSCH) configured by the SI-RNTI;
   transmitting, to the terminal, the second DCI, indicated by the SI, which includes resource information of a physical random access channel (PRACH) in which the random access preamble is transmitted, a transmission period of the random access preamble, and a transmission number of the random access preamble through a second PDCCH; and
   receiving, from the terminal, the random access preamble based on the SI and the second DCI.

2. The operation method according to claim 1, wherein the SI is a system information block (SIB) 2.

3. The operation method according to claim 1, wherein the resource information of the PRACH is dedicated resource information for the terminal or common resource information for a group to which the terminal belongs.

4. The operation method according to claim 1, wherein the resource information of the PRACH includes a PRACH identification number, and the random access preamble is received through resources indicated by the PRACH identification number.

5. The operation method according to claim 1, further comprising:
   when the received random access preamble requests to allocate uplink resources for the terminal, transmitting, to the terminal, a random access response which includes information indicating the uplink resources which are allocated based on the random access preamble.

6. An operation method of a terminal in a communication system, comprising:
   receiving, from a base station, first downlink control information (DCI) including a system information-radio network temporary identifier (SI-RNTI) through a first physical downlink control channel (PDCCH);
   receiving, from the base station, system information (SI) which includes information indicating a format of second DCI for a random access procedure and sequence information of a random access preamble through a physical downlink shared channel (PDSCH) configured by the SI-RNTI;
   receiving, from the base station, the second DCI, indicated by the SI, which includes resource information of a physical random access channel (PRACH) in which the random access preamble is transmitted, a transmission period of the random access preamble, and a transmission number of the random access preamble through a second PDCCH; and
   transmitting, to the base station, the random access preamble based on the SI and the second DCI.

7. The operation method according to claim 6, wherein the SI is a system information block (SIB) 2.

8. The operation method according to claim 6, wherein the resource information of the PRACH is dedicated resource information for the terminal or common resource information for a group to which the terminal belongs.

9. The operation method according to claim 6, wherein the resource information of the PRACH includes a PRACH identification number, and the random access preamble is transmitted through resources indicated by the PRACH identification number.

10. The operation method of claim 6, further comprising:
   when the random access preamble requests to allocate uplink resources for the terminal, receiving, from the base station, a random access response which includes information indicating the uplink resources which are allocated based on the random access preamble.

* * * * *